US012699989B2

(12) United States Patent
Dragan et al.

(10) Patent No.: US 12,699,989 B2
(45) Date of Patent: Aug. 4, 2026

(54) SYSTEMS AND METHODS FOR PROCESSING A BATCH PAYMENT IN REAL-TIME PAYMENT NETWORK

(71) Applicant: Worldpay, LLC, Symmes Township, OH (US)

(72) Inventors: Manuela Dragan, Westfield, NJ (US); Stephen E. Dinan, Austin, TX (US)

(73) Assignee: Worldpay, LLC, Symmes Township, OH (US)

( * ) Notice: Subject to any disclaimer, the term of this patent is extended or adjusted under 35 U.S.C. 154(b) by 288 days.

(21) Appl. No.: 17/662,495

(22) Filed: May 9, 2022

(65) Prior Publication Data

US 2023/0360030 A1 Nov. 9, 2023

(51) Int. Cl.
*G06Q 20/36* (2012.01)
*G06Q 20/38* (2012.01)
*G06Q 20/40* (2012.01)

(52) U.S. Cl.
CPC ....... *G06Q 20/3674* (2013.01); *G06Q 20/381* (2013.01); *G06Q 20/389* (2013.01); *G06Q 20/401* (2013.01)

(58) Field of Classification Search
CPC ............. G06Q 20/3674; G06Q 20/381; G06Q 20/389; G06Q 20/401; G06Q 20/4016; G06Q 40/02; G06Q 40/12; G06F 11/1474
See application file for complete search history.

(56) References Cited

U.S. PATENT DOCUMENTS 8,078,538 B1 * 12/2011 Buch ...................... G06Q 40/00
713/168
10,432,660 B2 * 10/2019 Crabtree ............. H04L 63/1433
(Continued)

FOREIGN PATENT DOCUMENTS

EP 1811440 A1 7/2007
WO WO-03083602 A2 * 10/2003 ............. G06Q 30/08

OTHER PUBLICATIONS

Anonymous: "Bulk File Handling User Guide Oracle Banking Payments Release 14.4.0.0.0", Feb. 1, 2021 (Feb. 1, 2021), pp. 1-46, XP093056579, Retrieved from the Internet: URL:https://docs.oracle.com/cd/F31489_01/PDF/User_Guides/Oracle-Banking-Payments_Modules/Bulk_File_Handling.pdf [retrieved on Jun. 21, 2023].

(Continued)

*Primary Examiner* — Patrick Mcatee
*Assistant Examiner* — Vincent I Idiake
(74) *Attorney, Agent, or Firm* — Bookoff McAndrews, PLLC

(57) ABSTRACT

Systems and methods for executing a batch of electronic transactions. One method may include: receiving, at a user interface of an information handling device associated with the real time transaction system, a selection to import a transaction file, wherein the transaction file comprises a listing of a plurality of transaction requests; identifying, via analysis of the transaction file, one or more characteristics associated with each of the plurality of transaction requests in the listing; determining, based on the identified one or more characteristics, whether a subset of the plurality of transaction requests are deficient; isolating, responsive to the determining, the subset from a remainder of the plurality of transaction requests; and facilitating, responsive to receiving user authorization input, a transaction process for each of the plurality of transaction requests in the remainder.

18 Claims, 14 Drawing Sheets

(56)                    References Cited

U.S. PATENT DOCUMENTS

| | | | |
|---|---|---|---|
| 11,087,409 B1 | 8/2021 | Bobley et al. | |
| 11,526,933 B1 * | 12/2022 | Adapala | G06Q 20/027 |
| 2003/0125969 A1 | 7/2003 | Kizer et al. | |
| 2003/0236754 A1 | 12/2003 | Thompson | |
| 2006/0131385 A1 * | 6/2006 | Kim | G06Q 20/425 |
| | | | 235/379 |
| 2007/0282724 A1 | 12/2007 | Barnes et al. | |
| 2011/0225127 A1 | 9/2011 | Abar et al. | |
| 2016/0210597 A1 * | 7/2016 | Zhu | G06Q 20/26 |
| 2020/0356697 A1 * | 11/2020 | Brannon | G06Q 50/18 |
| 2021/0174320 A1 * | 6/2021 | Carlyle | G06Q 20/3821 |
| 2022/0214996 A1 | 7/2022 | Guo et al. | |
| 2022/0237597 A1 | 7/2022 | Petersen et al. | |
| 2022/0309500 A1 | 9/2022 | Arunachalam et al. | |
| 2023/0153816 A1 * | 5/2023 | Onovae | G06Q 20/405 |
| | | | 705/44 |
| 2023/0334592 A1 | 10/2023 | Johari et al. | |

OTHER PUBLICATIONS

International Search Report issued in International Application No. PCT/US2023/021325 dated Jun. 29, 2023 (15 pages).

* cited by examiner

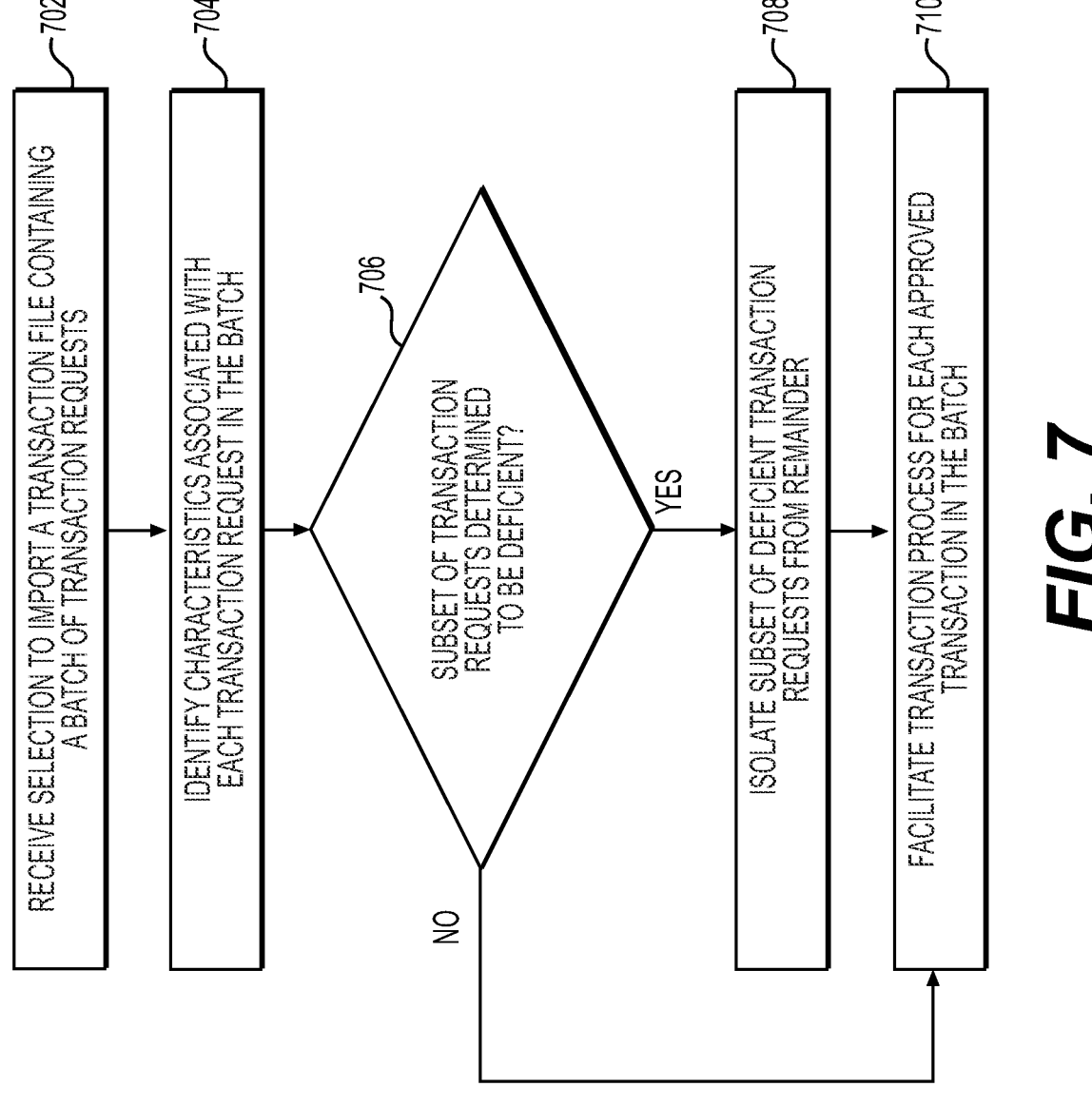

*FIG. 7*

702 — RECEIVE SELECTION TO IMPORT A TRANSACTION FILE CONTAINING A BATCH OF TRANSACTION REQUESTS

704 — IDENTIFY CHARACTERISTICS ASSOCIATED WITH EACH TRANSACTION REQUEST IN THE BATCH

706 — SUBSET OF TRANSACTION REQUESTS DETERMINED TO BE DEFICIENT?

NO

YES

708 — ISOLATE SUBSET OF DEFICIENT TRANSACTION REQUESTS FROM REMAINDER

710 — FACILITATE TRANSACTION PROCESS FOR EACH APPROVED TRANSACTION IN THE BATCH

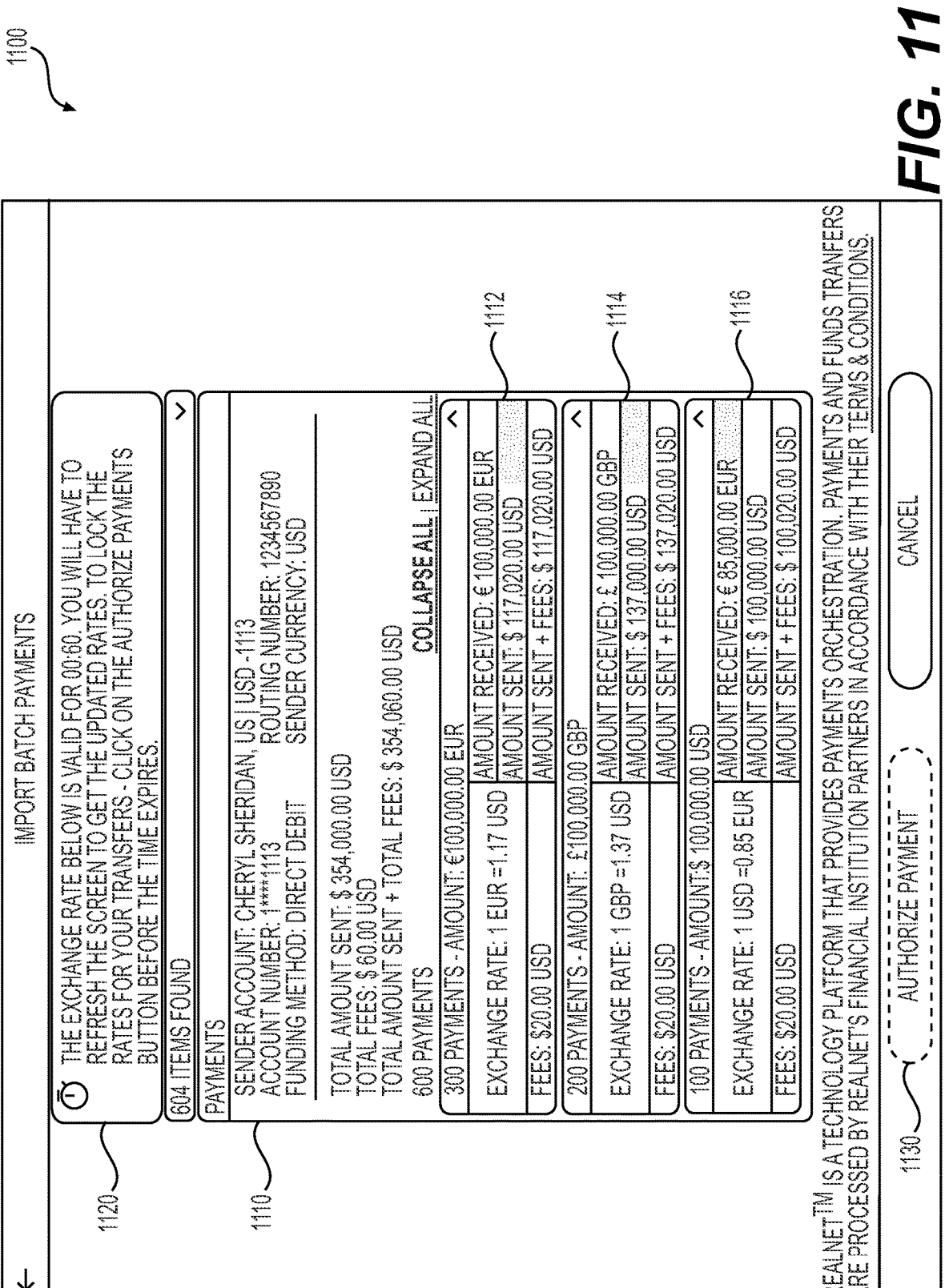

IMPORT BATCH PAYMENTS

⏱ THE EXCHANGE RATE BELOW IS VALID FOR 00:60. YOU WILL HAVE TO REFRESH THE SCREEN TO GET THE UPDATED RATES. TO LOCK THE RATES FOR YOUR TRANSFERS - CLICK ON THE AUTHORIZE PAYMENTS BUTTON BEFORE THE TIME EXPIRES.

604 ITEMS FOUND

PAYMENTS

SENDER ACCOUNT: CHERYL SHERIDAN, US | USD -1113
ACCOUNT NUMBER: 1****1113      ROUTING NUMBER: 1234567890
FUNDING METHOD: DIRECT DEBIT      SENDER CURRENCY: USD

TOTAL AMOUNT SENT: $ 354,000.00 USD
TOTAL FEES: $ 60.00 USD
TOTAL AMOUNT SENT + TOTAL FEES: $ 354,060.00 USD

600 PAYMENTS

COLLAPSE ALL | EXPAND ALL

300 PAYMENTS - AMOUNT: €100,000.00 EUR

| | |
|---|---|
| AMOUNT RECEIVED: € 100,000.00 EUR | |
| AMOUNT SENT: $ 117,020.00 USD | |
| AMOUNT SENT + FEES: $ 117,020.00 USD | |

EXCHANGE RATE: 1 EUR =1.17 USD

FEES: $20.00 USD

200 PAYMENTS - AMOUNT: £100,000.00 GBP

| | |
|---|---|
| AMOUNT RECEIVED: £ 100,000.00 GBP | |
| AMOUNT SENT: $ 137,000.00 USD | |
| AMOUNT SENT + FEES: $ 137,020.00 USD | |

EXCHANGE RATE: 1 GBP =1.37 USD

FEES: $20.00 USD

100 PAYMENTS - AMOUNT:$ 100,000.00 USD

| | |
|---|---|
| AMOUNT RECEIVED: € 85,000.00 EUR | |
| AMOUNT SENT: $ 100,000.00 USD | |
| AMOUNT SENT + FEES: $ 100,020.00 USD | |

EXCHANGE RATE: 1 USD =0.85 EUR

FEES: $20.00 USD

AUTHORIZE PAYMENT        CANCEL

REALNET™ IS A TECHNOLOGY PLATFORM THAT PROVIDES PAYMENTS ORCHESTRATION. PAYMENTS AND FUNDS TRANFERS ARE PROCESSED BY REALNET'S FINANCIAL INSTITUTION PARTNERS IN ACCORDANCE WITH THEIR TERMS & CONDITIONS.

1302 — RECEIVE TRANSACTION FILE CONTAINING A BATCH OF TRANSACTION REQUESTS

1304 — SEPARATE VALID TRANSACTION REQUESTS INTO BUNDLES BASED ON PAYMENT CURRENCY

1306 — PROVIDE TRANSACTION PREVIEW FOR EACH BUNDLE

1308 — PROCESS BATCH TRANSACTION RESPONSIVE TO AUTHORIZATION RECEIPT

SYSTEMS AND METHODS FOR PROCESSING A BATCH PAYMENT IN REAL-TIME PAYMENT NETWORK

TECHNICAL FIELD

The present disclosure relates generally to the field of electronic transactions and, more particularly, to systems and methods for executing a batch of real-time electronic transactions across multiple networks using a single platform.

BACKGROUND

Businesses, merchants, consumers, financial entities, and/ or government entities may perform electronic fund transfers, payment processing (e.g., e-commerce payments), capital management, etc. domestically and internationally over various payment networks. Situations may arise where a single individual or entity needs to process a large number of transactions (i.e., from a single sender account to many recipient accounts). Although systems and methods exist today for processing a batch payment, these conventional solutions are not optimized for multi-currency transactions (i.e., those batch transactions involving two or more currency types) and become increasingly burdensome and time-consuming if the scope of the batch payment is very large (e.g., for batch payments containing hundreds of transactions, etc.). The present disclosure is directed to addressing these and other drawbacks to existing electronic batch payment systems and services.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for providing a real-time transaction system capable of processing a batch of electronic transactions originating from a single sender account to an array of different receiver accounts.

An embodiment of the disclosure may be a method of executing a batch of electronic transactions by a real-time transaction system, the method comprising: receiving, at a user interface of an information handling device associated with the real time transaction system, a selection to import a transaction file, wherein the transaction file comprises a listing of a plurality of transaction requests; identifying, via analysis of the transaction file, one or more characteristics associated with each of the plurality of transaction requests in the listing; determining, based on the identified one or more characteristics, whether a subset of the plurality of transaction requests are deficient; isolating, responsive to the determining, the subset from a remainder of the plurality of transaction requests; and facilitating, responsive to receiving user authorization input, a transaction process for each of the plurality of transaction requests in the remainder.

An embodiment of the disclosure may be a real-time transaction system, including: one or more computer readable media storing instructions for executing a real-time electronic transaction; and one or more processors configured to execute the instructions to perform operations comprising: receiving, at a user interface of an information handling device associated with the real time transaction system, a selection to import a transaction file, wherein the transaction file comprises a listing of a plurality of transaction requests; identifying, via analysis of the transaction file, one or more characteristics associated with each of the plurality of transaction requests in the listing; determining, based on the identified one or more characteristics, whether a subset of the plurality of transaction requests are deficient; isolating, responsive to the determining, the subset from a remainder of the plurality of transaction requests; and facilitating, responsive to receiving user authorization input, a transaction process for each of the plurality of transaction requests in the remainder.

An embodiment of the disclosure may be a non-transitory computer-readable medium storing instructions for executing a batch of electronic transactions, the instructions, when executed by one or more processors, causing the one or more processors to perform operations, comprising: receiving, at a user interface of an information handling device associated with the real time transaction system, a selection to import a transaction file, wherein the transaction file comprises a listing of a plurality of transaction requests; identifying, via analysis of the transaction file, one or more characteristics associated with each of the plurality of transaction requests in the listing; determining, based on the identified one or more characteristics, whether a subset of the plurality of transaction requests are deficient; isolating, responsive to the determining, the subset from a remainder of the plurality of transaction requests; and facilitating, responsive to receiving user authorization input, a transaction process for each of the plurality of transaction requests in the remainder.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE DRAWINGS

The accompanying drawings, which are incorporated in and constitute a part of this specification, illustrate several embodiments and together with the description, serve to explain the principles of the disclosure.

FIG. 7 illustrates a flowchart of an exemplary method of executing an electronic batch transaction on an electronic transaction system, according to one aspect of the present disclosure.

FIG. 11 illustrates an exemplary application portal interface, according to one aspect of the present disclosure.

DETAILED DESCRIPTION OF EMBODIMENTS

Figure 1:
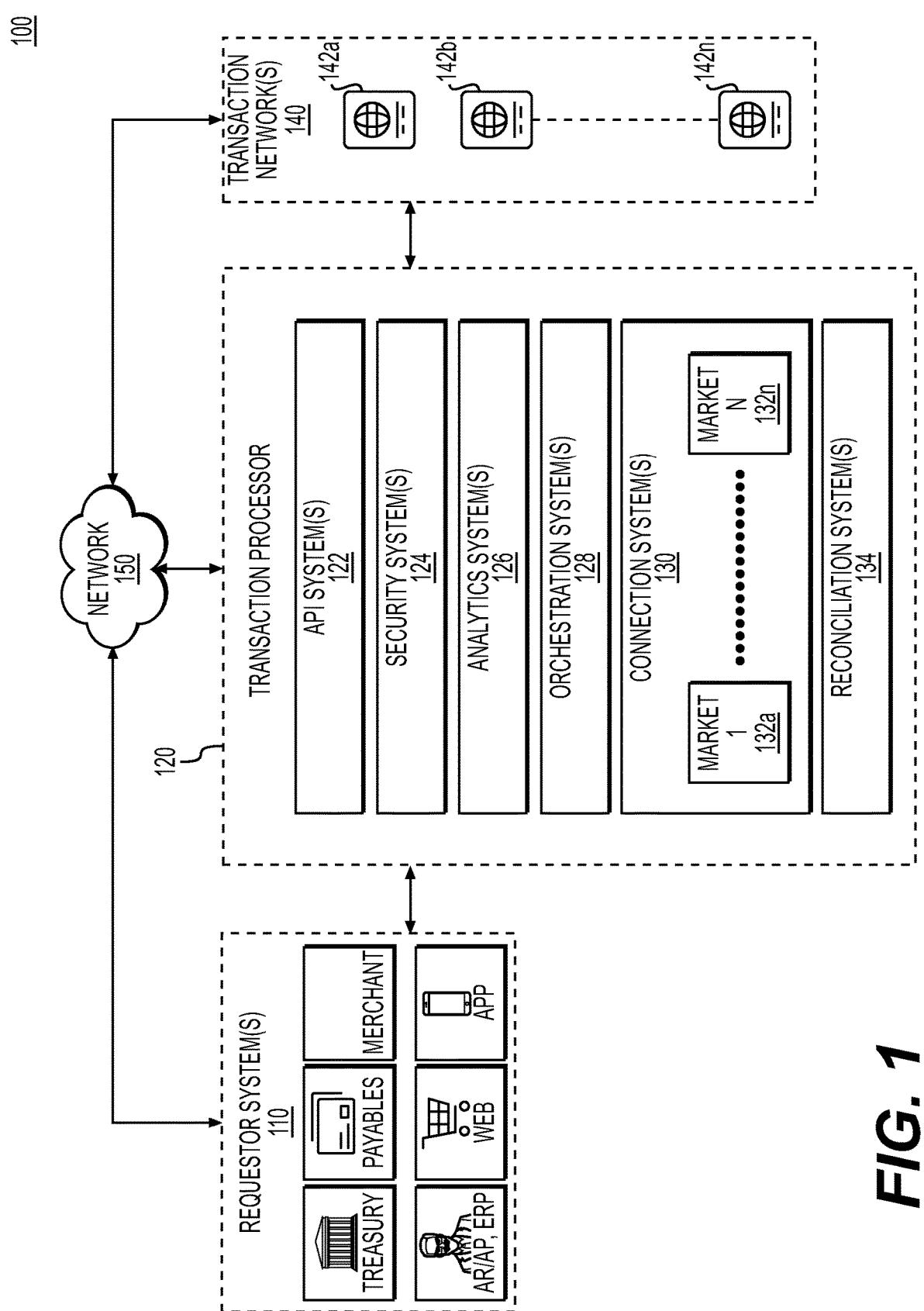
FIG. 1 depicts a block diagram of an exemplary electronic transaction system, according to one aspect of the present disclosure.

The following embodiments describe systems and methods for processing a batch of electronic transactions. More particularly, the embodiments contemplated in the present disclosure may enable merchants, customers, businesses, institutions, etc. to utilize a user interface of a real-time payment platform to more easily process large-volume cross-border batch payments.

As discussed above, conventional systems capable of processing batch transactions contain a variety of drawbacks and deficiencies that degrade the user experience. For instance, although existing platforms enable users to process batch transactions involving a single currency exchange (e.g., a batch of 600 transaction requests in which each transaction is to be converted from U.S. dollars (USD) to euros (EUR)), there is currently no system that is capable of reconciling a single batch having two or more currency exchanges (e.g., a batch of 600 transaction requests from which 300 transactions are to be converted from USD to EUR, 200 transactions are to be converted from USD to pound sterling (GBP), and 100 transactions are to be converted from USD to ruble (RUB)). In such a situation, a user would need to: 1) identify the type of currency exchange associated with each transaction request in the batch; 2) group like currency exchange transaction requests together; and 3) submit multiple batch processing requests to account for each group. This process may be very time-consuming and burdensome. Additionally to the foregoing, conventional batch processing systems are substantially binary in nature in that either all the transactions in the batch are executed or none of them are. More specifically, no system or method currently exists that can isolate the deficient transactions in the batch (i.e., those transaction requests containing incorrect sender, receiver, and/or payment information) while still allowing the remainder of the valid transaction requests to be processed.

To address the above-noted problems, the present disclosure describes systems and methods that provide an application platform that can be utilized by users to facilitate batch transactions. This platform may: allow users to select and import a transaction file containing information associated with a batch of electronic transactions, identify and sequester any transaction requests from the batch that are deemed to be deficient, and thereafter process any and all approved transaction requests. The batch processing system associated with the application platform may include: an application portal interface, a batch import service, a payment choreographer, a routing engine, a scheme cross border adaptor, a scheme cross border business-to-business (B2B) adaptor, and a transaction query service that communicate with one another to facilitate and execute batch transactions of the present disclosure.

In one embodiment, a user may first select, via interaction with a user interface, a transaction file to import into a batch processing portal. The transaction file may contain a batch of transaction requests that each contain various types of information about their respective transactions (e.g., sender information, receiver information, payment information, etc.). During import, the batch processing system may analyze characteristics associated with each transaction request to determine if any deficiencies exist (e.g., improper sender or receiver information, an invalid bank code, an invalid international bank account number (IBAN), etc.). Additionally, the batch processing system may dynamically place each transaction request into a specific group, or "bundle", based at least on the designated receiver currency type. Thereafter, a user may be presented with an import results screen that provides an indication of the success rate of the importing process along with the dynamically determined bundle groups. A user may then choose to preview the entire batch payment, at which point they may be presented with a real-time exchange rate for each bundle group in which a currency exchange exists. The real-time exchange rate may remain valid for a predetermined period of time (e.g., 60 seconds, etc.) and if the user authorizes the transaction within this time period then each valid transaction request may be processed by the batch processing system.

It should be appreciated that particular consideration is made herein to payment transactions relating to businesses, merchants, and/or consumers. Despite this reference to payment transactions relating to businesses, merchants, and or consumers, certain disclosed systems and methods may apply equally well to various other e-commerce and electronic transactions. Effectively, any circumstance where credit, currency, crypto currency, collateralized funds, smart contracts, and/or tokenized funds thereto, is being transmitted over a network, systems and methods disclosed herein may be employed. Further, while the party seeking to initiate an electronic transaction and/or provide a third-party service may be referred to herein as a business, a merchant, or a consumer, a party seeking to initiate an electronic transaction need not be a business, a merchant, or a consumer, but may be a financial institution, a government institution, a service provider, a user, or any party seeking to execute an electronic transaction.

The subject matter of the present disclosure will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Referring now to the appended drawings, FIG. 1 depicts an exemplary real-time transaction system 100 including a requestor system(s) 110, a transaction processor 120, and a transaction network(s) 140. The requestor system(s) 110, the transaction processor 120, and the transaction network(s) 140 may be in communication with each other directly, indirectly, and/or via a network 150 (e.g., the Internet and/or one or more cloud networks). The requestor system(s) 110, the transaction processor 120, and the transaction network(s) 140 may also be in communication with each other directly via direct lines of communication, via combinations of physical, technological, and/or business relationships. The requestor system(s) 110 may include one more entities, for example, but not limited to, treasury, merchants, consumers, businesses, financial institutions, government institutions, etc. The requestor system(s) 110 may transmit, for example, a request to transmit electronic funds to one or more receivers.

In one embodiment, the requestor system(s) 110 may be configured to facilitate a business requesting to transmit electronic funds to a consumer. In this embodiment, the electronic funds may include, for example, legal settlements, insurance claims, shareholder dividends, loyalty payments, loans, investment disbursements, customer refund pay-outs, etc. In another embodiment, the requestor system(s) 110 may be configured to facilitate a business requesting to transmit electronic funds to another business. In this embodiment, the electronic funds may include, for example, accounts receivables/payables (AR/AP), rent payments, business loan payments, payroll, bank-to-bank cross border payments, supplier payments, freelancer disbursements, supply chain finance disbursements, business medical benefits disbursements, affiliate marketing programs disbursements, etc. In another embodiment, the requestor system(s) 110 may be configured to facilitate a consumer requesting to transmit electronic payments to a business (or a merchant). In this embodiment, the electronic payments may include, for example, payments at point of sale terminals, payments at eCommerce checkouts, online marketplace payments, online digital content payments, sports wagering payments, telecommunication bill payments, utilities payments, rent payments, investment payments, etc. In another embodiment, the requestor system(s) 110 may be configured to facilitate a user (e.g., any individual or consumer) requesting to transmit electronic funds to another user. In this embodiment, the electronic funds may include, for example, crowdfunding payments, mobile wallet payments, gift payments, person-to-person payments, account-to-account transfers, etc. In another embodiment, the requestors system(s) 110 may be configured to facilitate a government entity requesting to transmit electronic funds to a consumer. In this embodiment, the electronic funds may include, for example, government benefits payments, student aid payments, tuition payments, tuition reimbursement payments, etc. In another, the requestors system(s) 110 may be configured to facilitate a user or consumer requesting to transmit electronic payments to a government entity. In this embodiment, the electronic funds may include, for example, transit payments, parking payments, tax payments, permit payments, payroll payments, etc.

In one embodiment, the requestor system(s) 110 may utilize an integration portal (or platform) and/or integration services provided by the transaction processor 120 for integrating user experience and/or user interfaces (e.g., AR/AP, Enterprise Resource Planning (ERP) system, a website, an app, etc.) for interacting with the transaction processor 120. In some embodiments, the requestor system(s) 110 may be integrated with the transaction processor 120 by using integration tool kits/services and/or a do-it-yourself (DIY) model utilizing the API system(s) 122 of the transaction processor 120.

Still referring to FIG. 1, the transaction processor 120 may include an application programming interface (API) system(s) 122 (e.g., an API gateway), a security system(s) 124, an analytics system(s) 126, an orchestration system(s) 128, a connection system(s) 130, and a reconciliation system(s) 134. The connection system(s) 130 may be configured to communicate with various markets domestically and/or internationally (e.g., Markets 1-N 132a-132n). The transaction processor 120 may be configured to facilitate electronic transactions and communications between the requestor system(s) 110 and the transaction network(s) 140. For example, the API system(s) 122 may receive one or more requests to transfer funds (or payments) electronically from the requestor system(s) 110 via an API (e.g., a representational state transfer (RESTful), real-time API, or file-based batch API of the transaction processor 120. The RESTful API (or API) may be accessed over one or more public Hypertext Transfer Protocol Secure (HTTPS) endpoints. The batch API (or API) may be accessed over one or more public Secure File Transfer Protocol (SFTP) endpoints. The API may include capabilities to create customer identities in the transaction processor 120, associate bank accounts to the customer identities, and make payments between multiple accounts. The API system(s) 122 may communicate with the security system(s) 124, analytics system(s) 126, and the orchestration system(s) 128 to execute the electronic transactions of the present disclosure. For example, the API system(s) 122 may transmit the electronic fund transfer (or payment) requests to the orchestration system(s) 128. The orchestration system(s) 128 may then transmit the electronic payment requests to appropriate networks or schemes in the transaction network(s) 140 via the connection system(s) 130. (Further described later in detail below.) Additionally, the reconciliation system(s) 134 may receive notifications, messages, and/or acknowledgements from the transaction network(s) 140, and may transmit appropriate messages, alerts, and/or signals associated with the electronic fund transfer request to the requestor system(s) 110 in real-time.

The transaction processor 120 may be a single processor utilizing a single API domestically and/or internationally across the globe. That is, the transaction processor 120 may facilitate account-to-account real-time electronic transactions (e.g., electronic payments, funds transfer, currency exchange, reimbursement, asset managements, etc.) by establishing a client centric platform that unifies, orchestrates, and executes electronic transactions domestically and/or internationally. Moreover, the transaction processor 120 may be configured to execute electronic fund transfers, currency exchange transactions, tokenization, and/or electronic transaction authorizations within the single platform. Further, the transaction processor 120 may be configured to operate consistently, in accordance with globally accepted security and privacy practices. Furthermore, the transaction processor 120 may be configured to perform intelligent payment routing via the orchestration system(s) 128 in real-time based on user (e.g., the requestor system(s) 110) preferences. In some embodiments, the user may make changes to transaction routing preferences (e.g., time and costs of completing payment transactions) in real-time. The transaction processor 120 of the present disclosure may provide, among other things, a single partner accountability, cost reduction, improved cash flow, increased payment security, improved access to payments, and better insight and accountability of payments/funds. Thus, the transaction processor 120 may be a one-stop shop for executing payments transactions.

Still referring to FIG. 1, the transaction network(s) 140 may include one or more networks or schemes 142a, 142b-142n. The one or more schemes (or networks) 142a-142n may include, for example, an Automated Clearing House (ACH) networks (e.g., ACH, Same Day ACH, etc.), Card networks (e.g., American Express, Discover, MasterCard, Visa, etc.), Real Time Payment (RTP) networks (e.g., the Clearing House, etc.), blockchain networks, wire transfer networks, Faster Payments network, Bankers' Automated Clearing System (Bacs) Payment Schemes, the Clearing House Automated Payment System (CHAPS) network, Single Euro Payments Area (SEPA) network, SEPA Instant Credit Transfer (SCT Inst) network, and/or other financial platform networks (e.g., Dwolla, PayPal, Western Union, Currencycloud, TransferMate, etc.). The transaction network(s) 140 may complete or reject the electronic fund transfer request upon authenticating and/or authorizing the electronic fund transfer request in accordance with the established policies and/or rules of one or more of the schemes 142a, 142b-142n.

Referring now to the appended drawings, FIGS. 2-6 each depict an exemplary sub-system of the overarching real-time transaction system. The components and elements in each of the following sub-systems may be in communication with each other directly, indirectly, and/or via a network (e.g., the Internet and/or one or more cloud networks). Additionally, the components and elements in each of the following sub-systems may also be in communication with each other directly via direct lines of communication, via combinations of physical, technological, and/or business relationships.

Figure 2:
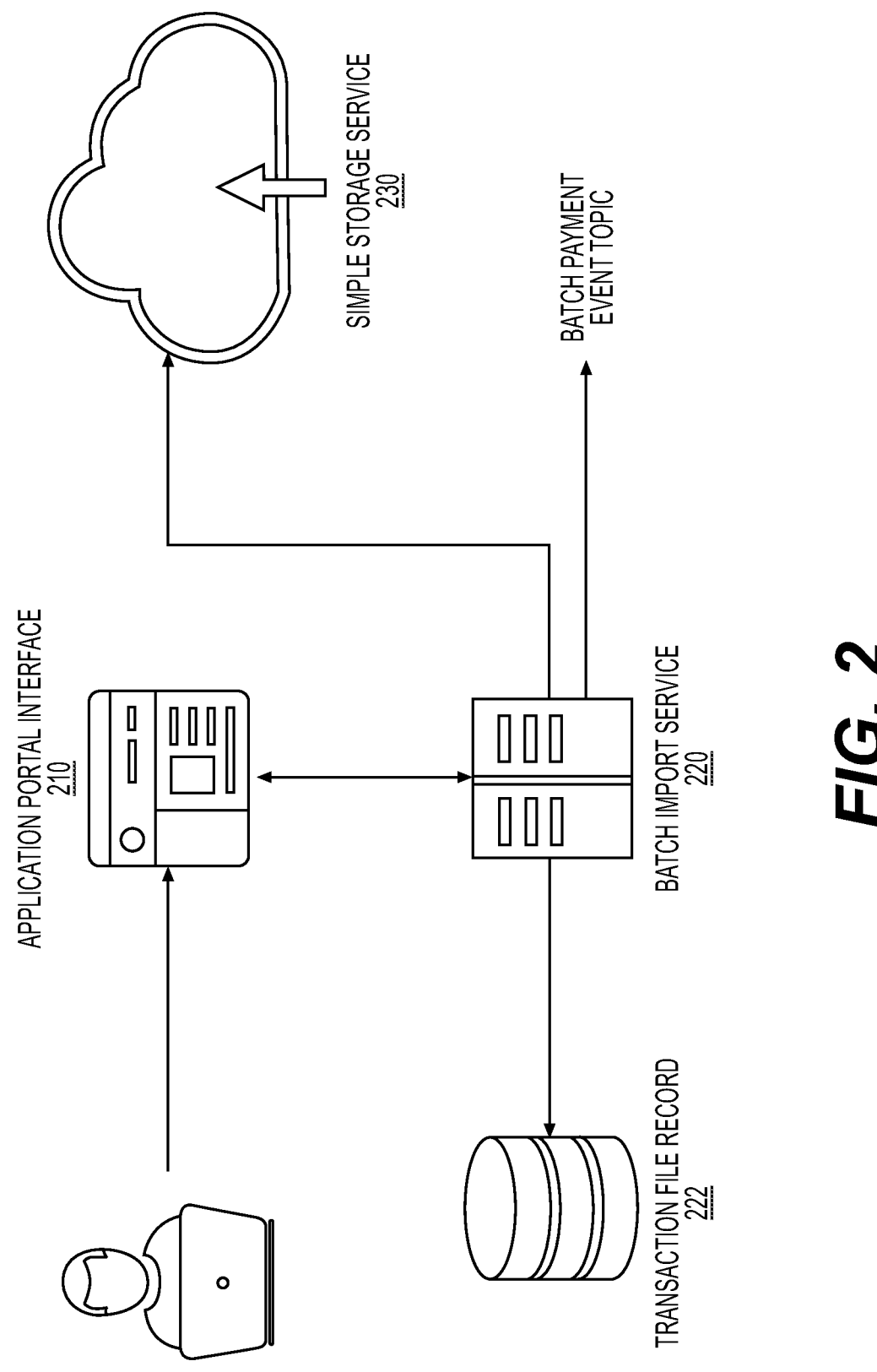
FIG. 2 depicts a diagram of a sub-system associated with the electronic transaction system, according to one aspect of the present disclosure.

FIG. 2 depicts an exemplary sub-system 200 of the comprehensive batch processing system including an application portal interface (API) 210, a batch import service (BIS) 220, a simple storage service (S3) 230, and all associated elements. In one embodiment, the API 210 may be configured to receive user input to upload a transaction file. The transaction file may contain a list, or batch, of transaction requests. In an embodiment, the batch may contain virtually any amount of transaction requests (e.g., 100, 500, 1000, etc.) and each transaction request may contain a variety of different data points, including: sender information (e.g., sender name, sender bank account identity, sender bank account native currency, etc.), receiver information (e.g., receiver name, receiver bank account identity, receiver bank account native currency, etc.), transaction information (e.g., transaction amount, payment currency, receiving currency, etc.), and the like. In an embodiment, the API 210 may require that the transaction file be of a specific file format (e.g., a comma-separated values (CSV) file, etc.) and may reject all attempts to upload files not having the appropriate file format.

Still referring to FIG. 2, responsive to receipt of the upload request, the API 210 may transmit the transaction file to the BIS 220. At this stage, the BIS 220 may encrypt the transaction file (e.g., using one or more encryption techniques known in the art) and send it to a tenant-specific S3 folder 230 for storage. Additionally, the BIS 220 may create and store a transaction file record 222 (e.g., in an accessible database, etc.), validate the file format (i.e., to ensure it comports with the predetermined file format of the API 110), and, assuming file format validity, count the transaction requests in the transaction file. The BIS 220 may then update the transaction file record 222 with the total number of identified and pending transaction requests. Thereafter, the BIS 220 may post an event with batch identification to Batch_Payment_Event topic and may then return an indication of the total number of identified transaction requests to the API 210. The API 210 may then query the BIS 220 for a batch status request. Responsive to receiving this request, the BIS 220 may itself query for the batch status in the transaction file record 222.

Figure 3:
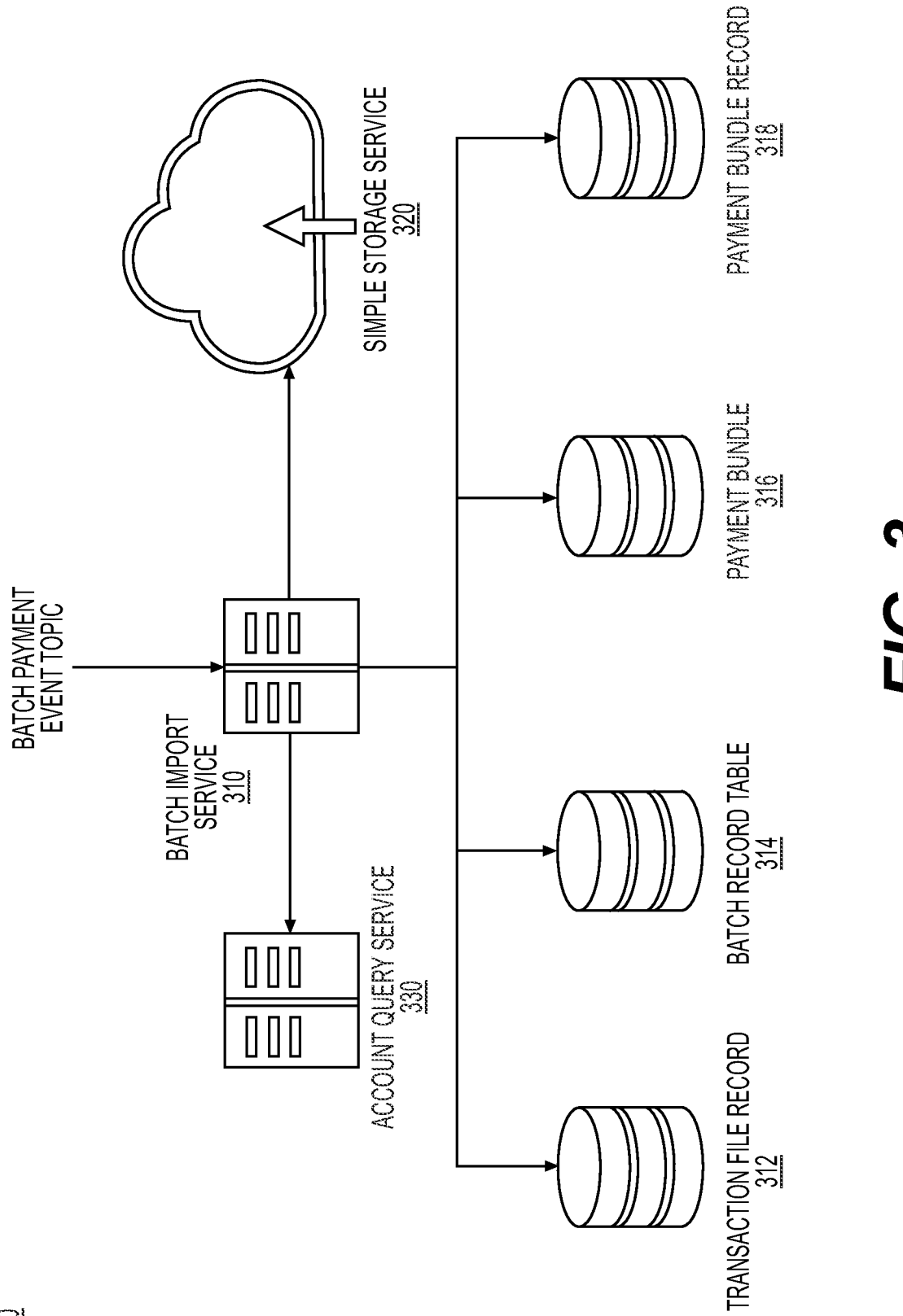
FIG. 3 depicts a diagram of a sub-system associated with the electronic transaction system, according to one aspect of the present disclosure.

FIG. 3 depicts an exemplary sub-system 300 of the comprehensive batch processing system including the BIS 310, the S3 tenant-specific folder 320, an account query service (AQS) 330, and all associated elements. Specifically, FIG. 3 represents the components of the real-time transaction system utilized to generate bundles of the transaction requests in the uploaded transaction file. In an embodiment, a user may interact with the API 210 to import a previously uploaded transaction file, as depicted by the process in FIG. 2. Responsive to receiving the import request, the BIS 310 may access the transaction file record 312 associated with the relevant transaction file. The transaction file record 312 may contain an indication of the S3 path that the BIS 310 must utilize to download the transaction file from the tenant-specific S3 folder 320. Once downloaded from the S3 folder 320, the transaction file may be decrypted using one or more known decryption techniques known in the art.

Still referring to FIG. 3, a number of actions may then be taken by the sub-system 300 to sort each transaction request into its appropriate bundle group. Firstly, the BIS 310 may create an entry in a batch record table 314 for each transaction request. The BIS 310 may then identify the sender and/or receiver accounts for each transaction request by communicating with the AQS 330. More particularly, the BIS 310 may reference an account ID associated with the sender and/or receiver accounts or reference an account number along with the associated transit code. The AQS 330 may then utilize this information to return sender and/or receiver account data for each transaction request back to the BIS 310. Thereafter, the BIS 310 may determine whether a payment bundle 316 and/or funding method exists for the given sender account for each transaction request. If the BIS 310 determines that no payment bundle exists for the listed sender account (e.g., such a situation may be applicable for the first transaction request processed in the batch), then the BIS 310 may create a payment bundle 316 and populate an associated table with the sender account details. Conversely, if the BIS 310 determines that a payment bundle 316 already exists, then the payment bundle's 316 receiver account in the associated table should be incremented. Additionally, the BIS 310 may determine if a payment bundle record 318 already exists for the payments and receiver currency codes. Responsive to arriving at a negative determination, the payment bundle record 318 may be populated with the receiver and payment currency codes. Conversely, responsive to arriving at a positive determination, the BIS 310 may update, in the payment bundle record 318, the total number of transaction requests in the payment bundle 316 and increment the total number of receivers.

Figure 4:
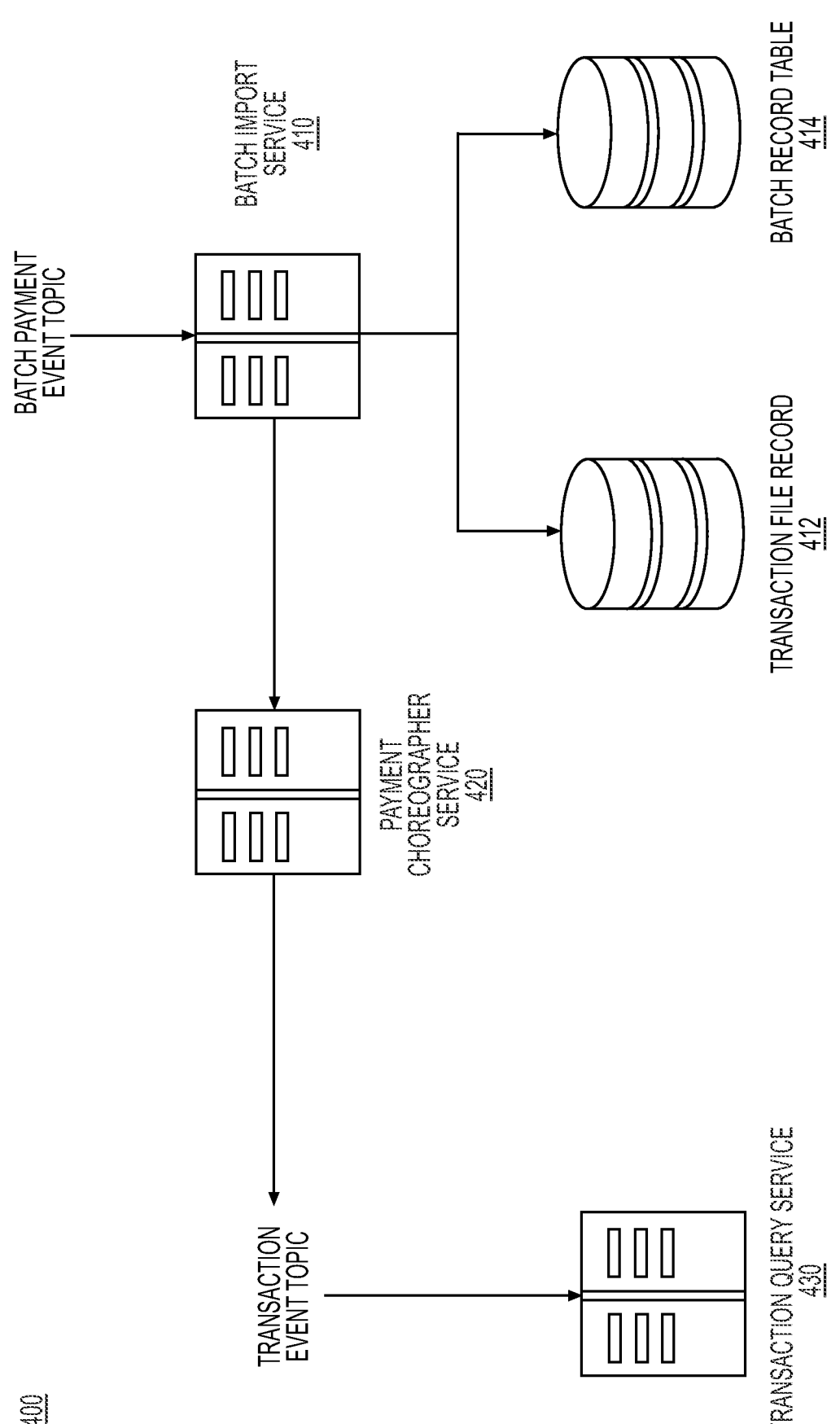
FIG. 4 depicts a diagram of a sub-system associated with the electronic transaction system, according to one aspect of the present disclosure.

FIG. 4 depicts an exemplary sub-system 400 of the comprehensive real-time transaction system including the BIS 410, a payment choreographer service (PCS) 420, a transaction query service (TQS) 430, and all associated elements. Specifically, FIG. 4 represents the components of the real-time transaction system utilized to construct placeholder transactions for each transaction request in the batch. In an embodiment, the BIS 410 may receive an indication of a pending transaction event for the batch. The BIS 410 may communicate with the PCS 420 to call a new PCS endpoint to initiate a batch transaction placeholder for each transaction request in the transaction file. The PCS 420 may validate the payment request using existing logic and then subsequently transmit an indication of the new batch-payment record event to a Transaction_Event topic. The BIS 410 may then update the relevant fields and statuses in the transaction file record 412 with the sender account ID, receiver account ID, payment bundle ID, transaction ID, and payment bundle group. The BIS 410 may also update the batch record table 414 by decrementing the pending count (i.e., for each transaction request for which a placeholder transaction has yet to be created) and incrementing the successful count (i.e., for each transaction request for which a placeholder transaction has been created) or failed count (i.e., for each transaction request for which a placeholder transaction could not be created due to one or more deficiencies with the transaction request). If the pending count is 0 (i.e., no more transaction requests in the batch need to be processed), then the batch record table 314 may be updated as complete. The TQS 430 may then store a new transaction from the Transaction_Event topic and sets the status to "BatchRecordRequested".

Figure 5:
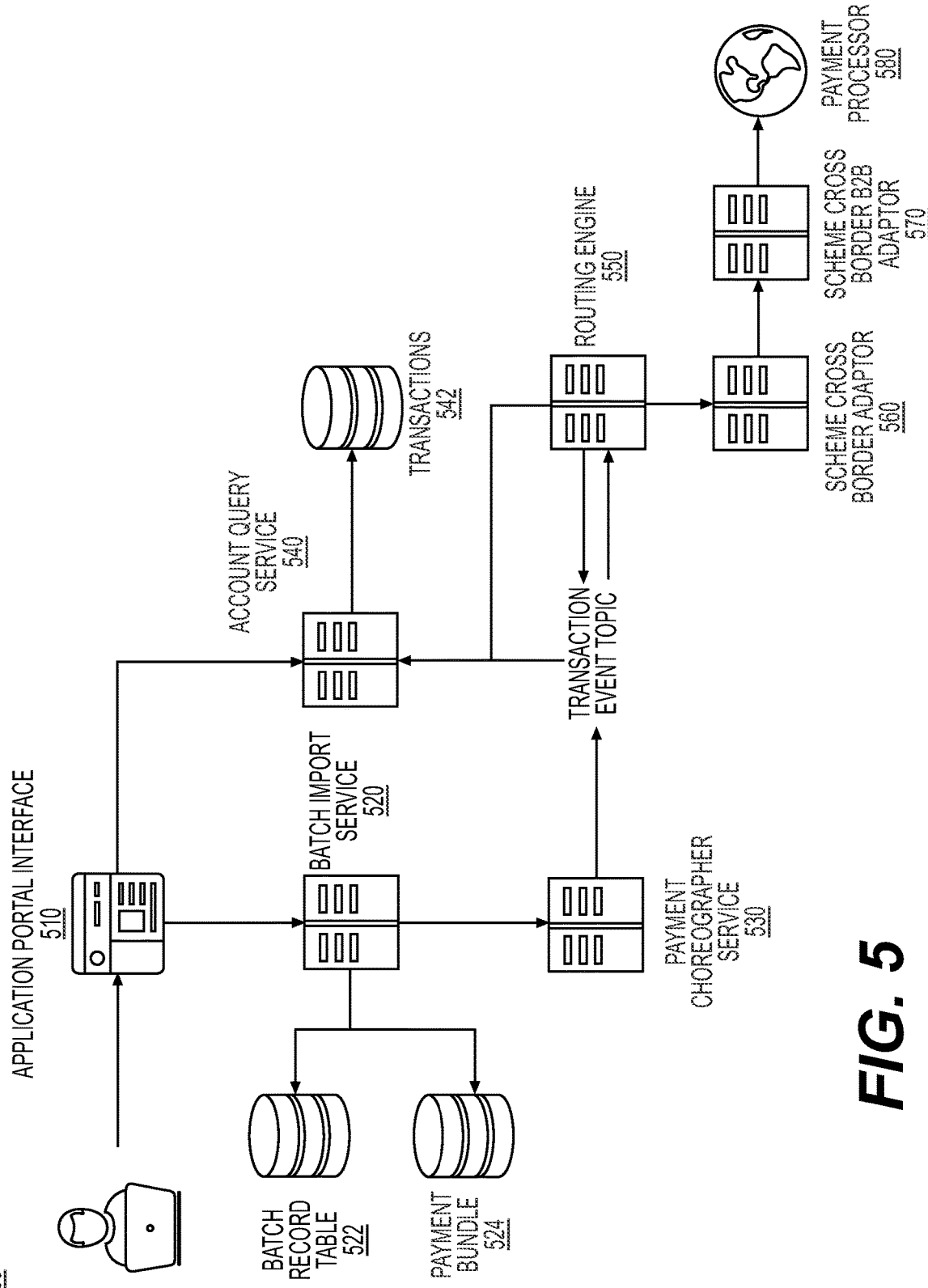
FIG. 5 depicts a diagram of a sub-system associated with the electronic transaction system, according to one aspect of the present disclosure.

FIG. 5 depicts an exemplary sub-system 500 of the comprehensive real-time transaction system including the API 510, the BIS 520, the PCS 530, the TQS 540, a routing engine 550, a scheme cross border adaptor (SCBA) 560, a scheme cross border business-to-business adaptor (B2B SCBA) 570, an electronic payments processor 580, and all associated elements. Specifically, FIG. 5 represents the components of the real-time transaction system utilized to provide a user with a preview of the transaction for each bundle. In an embodiment, a user may choose, from the API 510, an option to obtain a preview of the transaction for each bundle. The API 510 may communicate with the BIS 520 and instruct it to call a new BIS preview bundle endpoint. The BIS 520 may then access the batch record table 522 to retrieve all of the relevant information associated with each viable transaction request in the batch, including the bundle each transaction request is associated with. The BIS 520 may then provide to the PCS 530 the list of transaction IDs obtained from the batch record table 522 it wants to preview. In response, the PCS 530 may return a transaction ID for the batch, which the BIS 520 saves in the table associated with each payment bundle 524. The PCS 530 may then generate a batch payment preview event, which includes all known transaction IDs in the event as well as a batch ID that is generated in the event. The PCS 530 may provide the BIS 520 with the batch ID, which correspondingly saves it in the payment and returns it to the API 510.

Still referring to FIG. 5, the TQS 540 and the routing engine 550 may receive an indication of the new batch payment preview event. The TQS 540 may create a new transaction 542, which includes the list of transaction IDs from the batch. The TQS 540 may also update all the included transactions' batch id to the batch's transaction id. The routing engine 550 may query the TQS 440 for all of the transaction IDs to include in the event and then queries for all unique batch ids (if any) and ensures that all batches have the appropriate status designation (e.g., that the status does not have a "sent" or "later" status designation, etc.). The routine engine 550 may then call the preview payment API on the SCBA 560 with the list of transactions to preview. The SCBA 560 may then correspondingly communicate the same list of transactions to the B2B SCBA 570. The B2B SCBA 570 subsequently communicates with an electronic payments processor 580 to book the transaction. In response, the electronic payments processor 580 returns the exchange rates for each bundle of transaction requests in the batch. These rates may be communicated back up the channel and, after receiving the updated information from the SCBA 560, the routing engine 550 may generate a new Payment_Options_Chosen event for the batch. The TQS 540 may then process the new event like a normal payment event and relay this processed information back to the API 510. The API 510 may then provide the transaction preview to the user via the interface.

Figure 6:
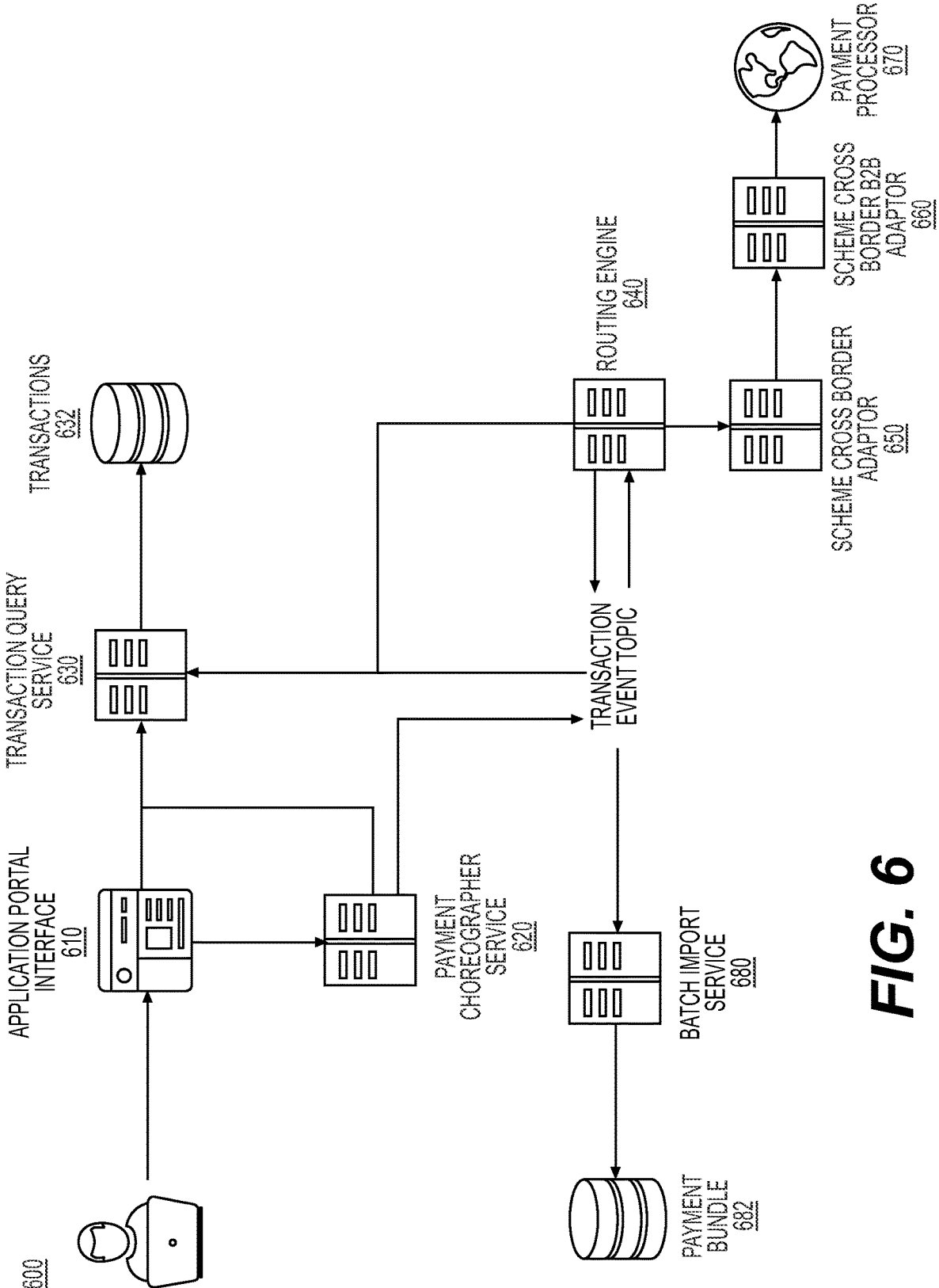
FIG. 6 depicts a diagram of a sub-system associated with the electronic transaction system, according to one aspect of the present disclosure.
Figure 8:
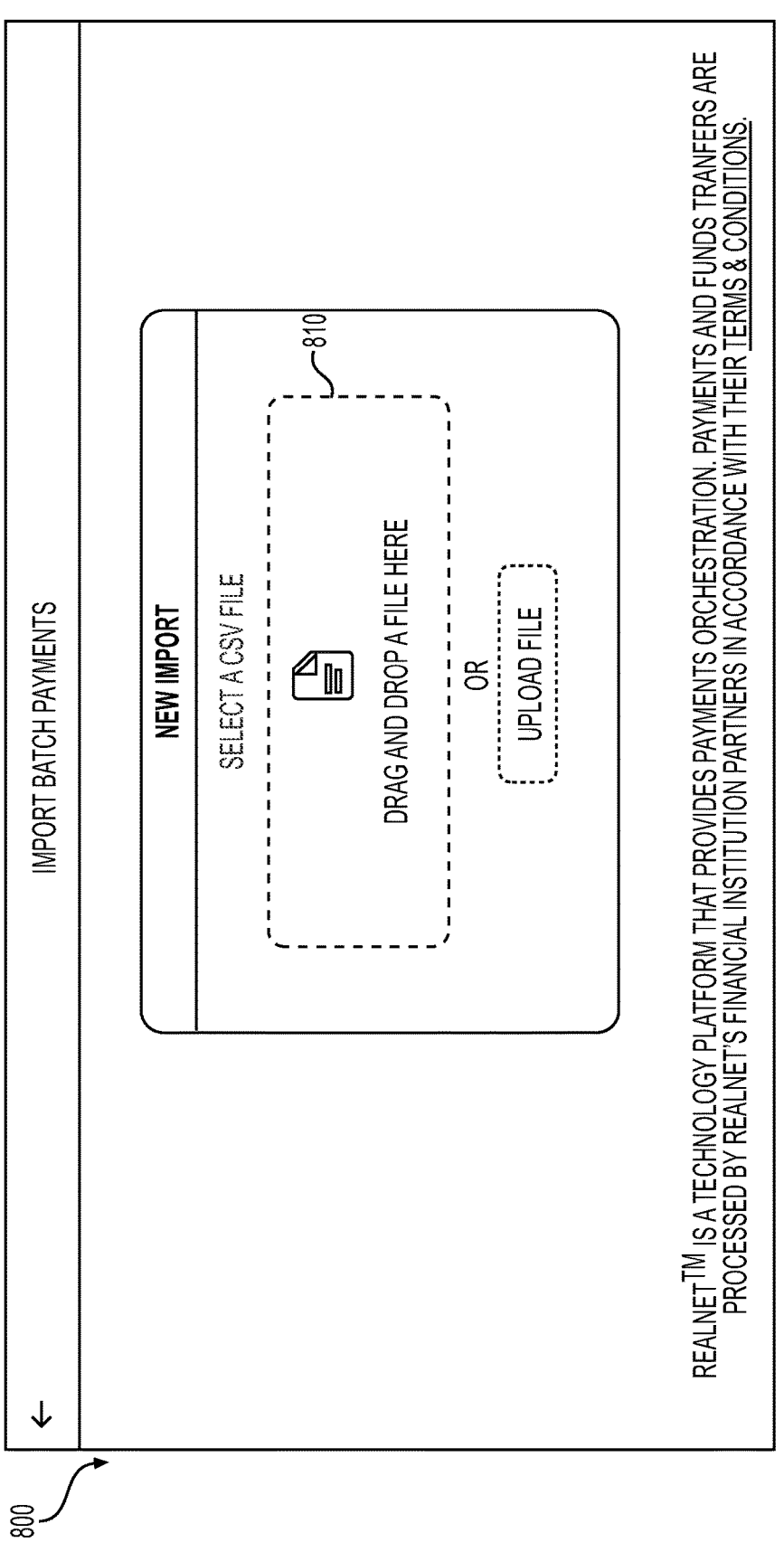
FIG. 8 illustrates an exemplary application portal user interface, according to one aspect of the present disclosure.

FIG. 6 depicts an exemplary sub-system 600 of the comprehensive real-time transaction system including the API 610, the PCS 620, the TQS 630, the routing engine 640, the SCBA 650, the B2B SCBA 660, the electronics payment processor 670, the BIS 680, and all associated elements. Specifically, FIG. 6 represents the components of the real-time transaction system utilized to authorize the payments associated with each transaction request in the batch. In an embodiment, upon review of the previewed transactions, a user may, via the API 610, choose to authorize the batch transaction. Responsive to receiving an authorization selection, the API 610 may communicate with the PCS 620 and instruct it to authorize a transaction endpoint. The PCS 620 may find the payment record in the TQS 630 and validate that it can be authorized. The PCS 630 may then post a payment-authorized event to the Transaction_Event topic for the batch transaction ID.

Still referring to FIG. 6, the routing engine 640 receives the payment-authorized event and queries the TQS 630 for the transaction. The routing engine 640 then calls the authorize payment API on the SCBA 650 with the list of member transaction IDs to authorize. The SCBA 650 calls the B2B SCBA 660 with the same list of transaction IDs. The B2B SCBA 660 then looks up the transaction IDs in the database in order to obtain a list of correspond IDs utilized by the electronics payment processor 670 and ensures that none of them have already been sent. The B2B SCBA 660 then communicates with the electronics payment processor 680 with the list of IDs needed to be authorized. The B2B SCBA 660 then updates the batch transaction ID with the response from the electronic payments processor 670 and communicates these results to the SCBA 650, which itself relays the results to the routing engine 640. The routing engine 640 then generates a batch-payment-sent event with the authorization response details. The TQS 630 receives the batch-payment-sent event and updates the batch transaction's status to "sent" and sets the external provider and provider transaction ID. The BIS 680 then receives the batch-payment-sent event and updates the table associated with each viable payment bundle 682 with the batch ID and the status of "sent". The indication of successful transaction processing is then communicated back to the API 610 via the TQS 630.

FIG. 7 illustrates a flowchart of an exemplary method 700 of executing an electronic batch transaction of the present disclosure. Additional reference will be made to FIGS. 8-11 to supplement discussion of the method 700. Exemplary process flows of the method 700, performed in accordance with the real-time transaction system 100, including sub-systems 200, 300, 400, 500, and 600 above, are described hereinafter.

At step 702, an embodiment may receive a user selection to import a transaction file containing a batch of transaction requests. In an embodiment, each transaction request may represent a payment from a sender account to a receiver account. These payments may be domestic transactions (i.e., occurring within the same country), cross-border transactions (i.e., occurring internationally), or a batch may contain a combination thereof. Additionally, each transaction request may contain a variety of different data points such as, for example: sender information (e.g., sender name, sender bank account identity, sender bank account native currency, etc.), receiver information (e.g., receiver name, receiving bank account identity, receiver bank account native currency, etc.), transaction information (e.g., transaction amount, payment currency, receiver currency, etc.), and the like. In an embodiment, a user may choose to import, via interaction with the API, a previously uploaded transaction file. For example, with reference to FIG. 8, an application user interface 800 is presented and a user may drag and drop a previously uploaded file into a designated file drop area 810.

At step 704, an embodiment may identify characteristics associated with each transaction request in the imported transaction file. The identification may be facilitated, for example, via the components and processes associated with sub-systems 300 and 400, depicted in FIG. 3 and FIG. 4 respectively and previously described above. More particularly, an embodiment may analyze the information associated with each transaction request to determine whether it is a valid request. In this regard, an embodiment may verify one or more characteristics of each transaction request, including: the sender information, receiver information, payment information, and the like.

At step 706, an embodiment may determine whether one or more of the transaction requests in the transaction file were determined to be deficient. Such a determination may be facilitated by utilizing the results of the characteristic identification process in step 704 and comparing those results to stored information available in one or more accessible databases. Potential deficiencies may include incorrect sender or receiver name, incorrect bank name, incorrect IBAN, and the like. Responsive to determining, at step 706, that no deficiencies exist with any of the requests in the transaction file, an embodiment may proceed with the transaction process, as further described below. Conversely, responsive to determining, at step 706, that at least a subset of the transaction requests contained a deficiency (i.e., that at least one transaction requests contained an error), then an embodiment may, at step 708, isolate the subset of deficient transaction requests from the remainder of requests.

Figure 9:
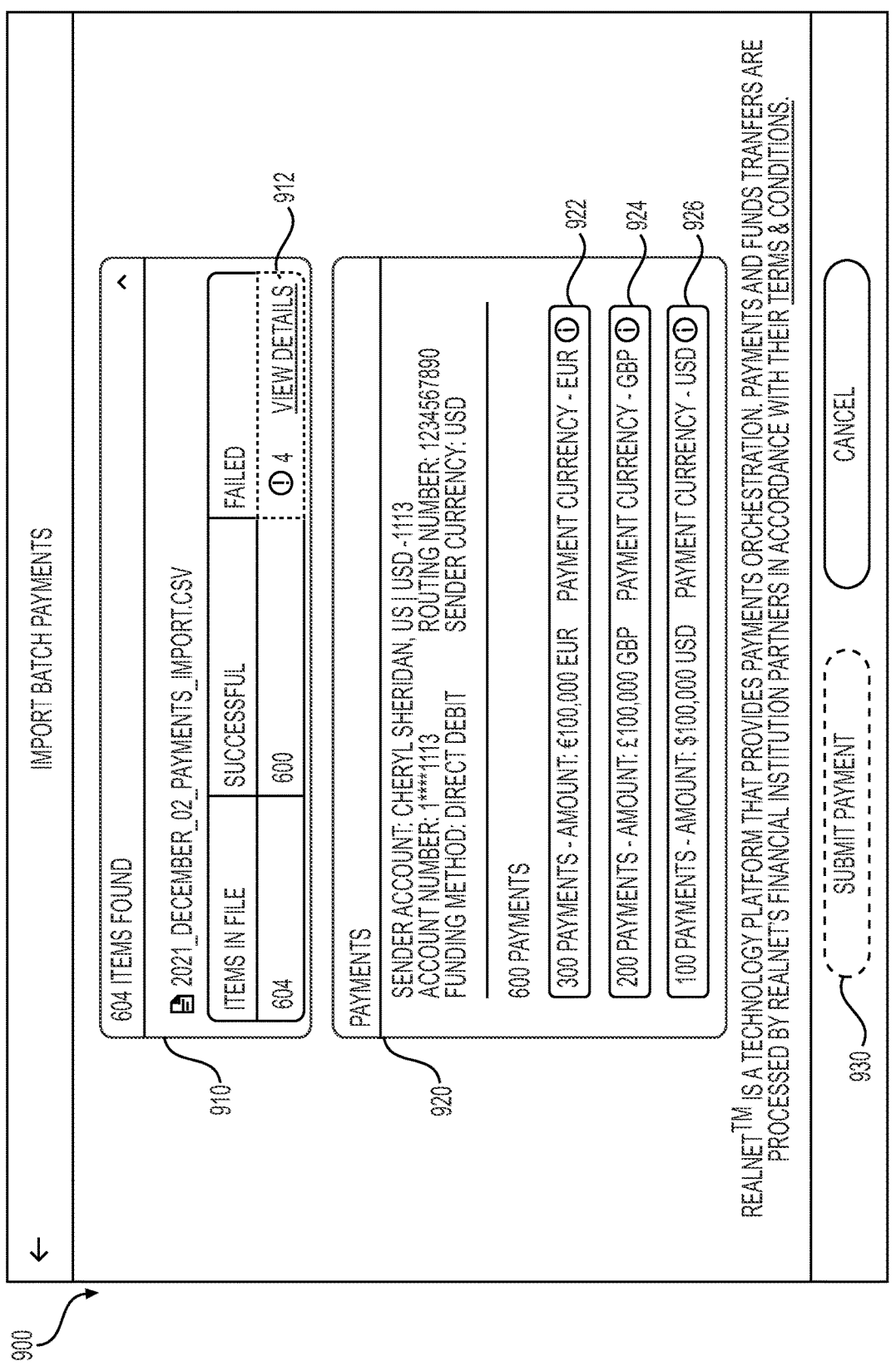
FIG. 9 illustrates an exemplary application portal user interface, according to one aspect of the present disclosure.
Figure 10:
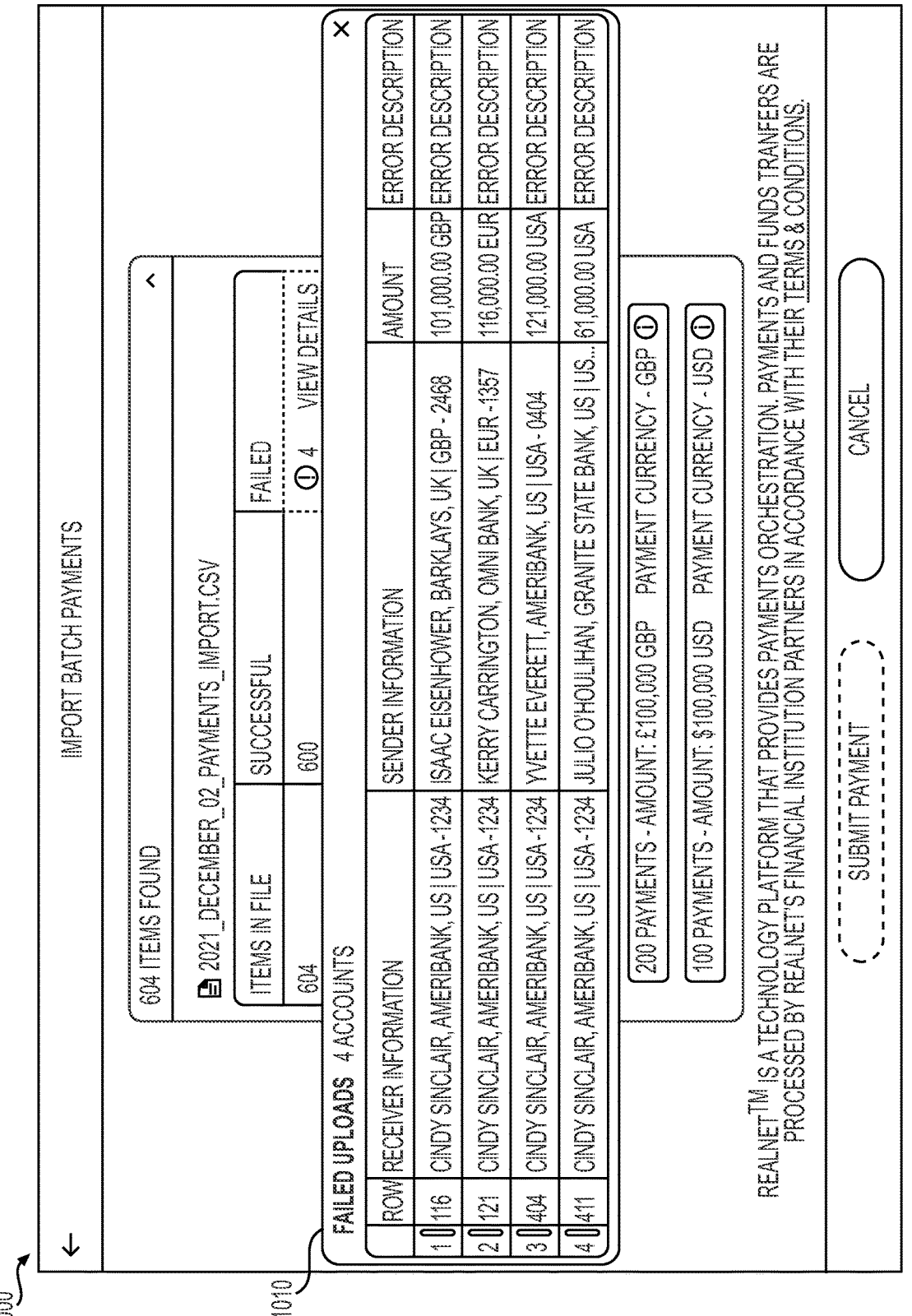
FIG. 10 illustrates an exemplary application portal interface, according to one aspect of the present disclosure.

In an embodiment, a user may be apprised of the results of the import process. For instance, if one or more issues are identified with any transaction request then an indication may be provided to the user. For example, with reference to FIG. 9, an application user interface 900 may display an import results page. The import results page may contain a section 910 indicating: the amount of identified requests in the transaction file, the number of successfully imported transaction requests, and the number of transaction requests that failed to import (e.g., the section 910 in FIG. 9 illustrates that 604 transaction requests were present in the transaction file, 600 requests were imported successfully, and 4 requests failed to import). In an embodiment, a user may be able to obtain additional information regarding the failed imports by, for example, selecting an option 912 in section 910 to view additional details. Responsive to selecting this option, a popup screen may appear that may identify each deficient transaction request and/or may identify the specific issue with each request (e.g., in an error description section, etc.). For example, with reference to FIG. 10, an application user interface 1000 is presented that may, in response to selection of the option 912, display an error description window 1010 that indicates that four transaction requests were deficient and may show the issues present therein. Additionally or alternatively to the foregoing, an embodiment may automatically display the detailed error information associated with each deficient transaction request without receipt of any additional user input (e.g., an embodiment may automatically present the error description window 1010 illustrated in FIG. 10 upon presentation of the import results page).

At step 708, an embodiment may isolate the deficient requests from the remainder of valid requests. More particularly, in an embodiment, all remaining valid requests may be separated into payment bundles. Each of these bundles may be associated with a particular payment currency. More particularly, the payment currency in each bundle may correspond to the type of currency associated with the receiver's bank account. For example, in a situation where a sender wants to send $100 to a receiver, if the receiver's native account currency is in EUR then the payment currency for the transaction may also be in EUR. In an embodiment, each payment bundle may contain those transaction requests having a like payment currency. For example, with reference to FIG. 9, a payment bundle section 920 is provided that indicates that 600 valid transaction requests exist and those valid requests are separated into three distinct payment bundles, i.e., Bundle One (associated with EUR) 922, Bundle Two (associated with GBP) 924, and Bundle Three (associated with USD) 926.

In an embodiment, if a user wants to ensure that each transaction request in the transaction file is processed together, then they may have an opportunity to remedy the deficiencies present in the isolated transaction requests before transaction authorization. For example, in an embodiment, a user may access the formatted document associated with the transaction file. Utilizing information provided in the error description window 1010, as illustrated for instance in FIG. 10, a user may easily identify which transaction requests need to be addressed and what issues those transaction requests contained. After fixes have been made to the relevant document, a user may upload the file again and the processes outlined in sub-systems 200 and 300 may be repeated. Alternatively, a user may choose to proceed forward with the transaction by only processing the valid requests.

At step 710, an embodiment may facilitate the transaction process for each valid transaction request. In an embodiment, subsequent to visualizing the payment bundles, a user may choose to receive a preview of the entire transaction along with the costs associated therewith. For instance, as a non-limiting example of the foregoing, subsequent to detecting selection of the "submit payment" button 930 presented in FIG. 9, an embodiment may present, on the application interface 1100 in FIG. 11, a preview page. This preview page may provide the user with a variety of different types of information. For instance, the preview page may contain a summary section 1110 that contains information regarding the total transaction amount for the entire transaction (i.e., the total amount sent+total fees) as well as the total transaction amount for each bundle along with the exchange rate associated therewith. Additionally to the foregoing, the preview page may contain a notification 1120 indicating that authorization for the previewed transaction batch must be received from the user within a predetermined time period (e.g., 60 seconds, etc.) for the provided exchange rates to be applicable. Specifically, the provided exchange rates for each bundle (i.e., 1112, 1114, and 1116) are only valid during the designated time period and if authorization is not received within that time period to process the transaction then a user may need to refresh the page or preview payment again in order to obtain an updated exchange rate for each bundle. In an embodiment, responsive to detecting that a user has authorized payment of the batch transaction (e.g., by selection of an "authorize payment" button 1130), an embodiment may then facilitate transaction processing for each remaining transaction request.

Figure 12:
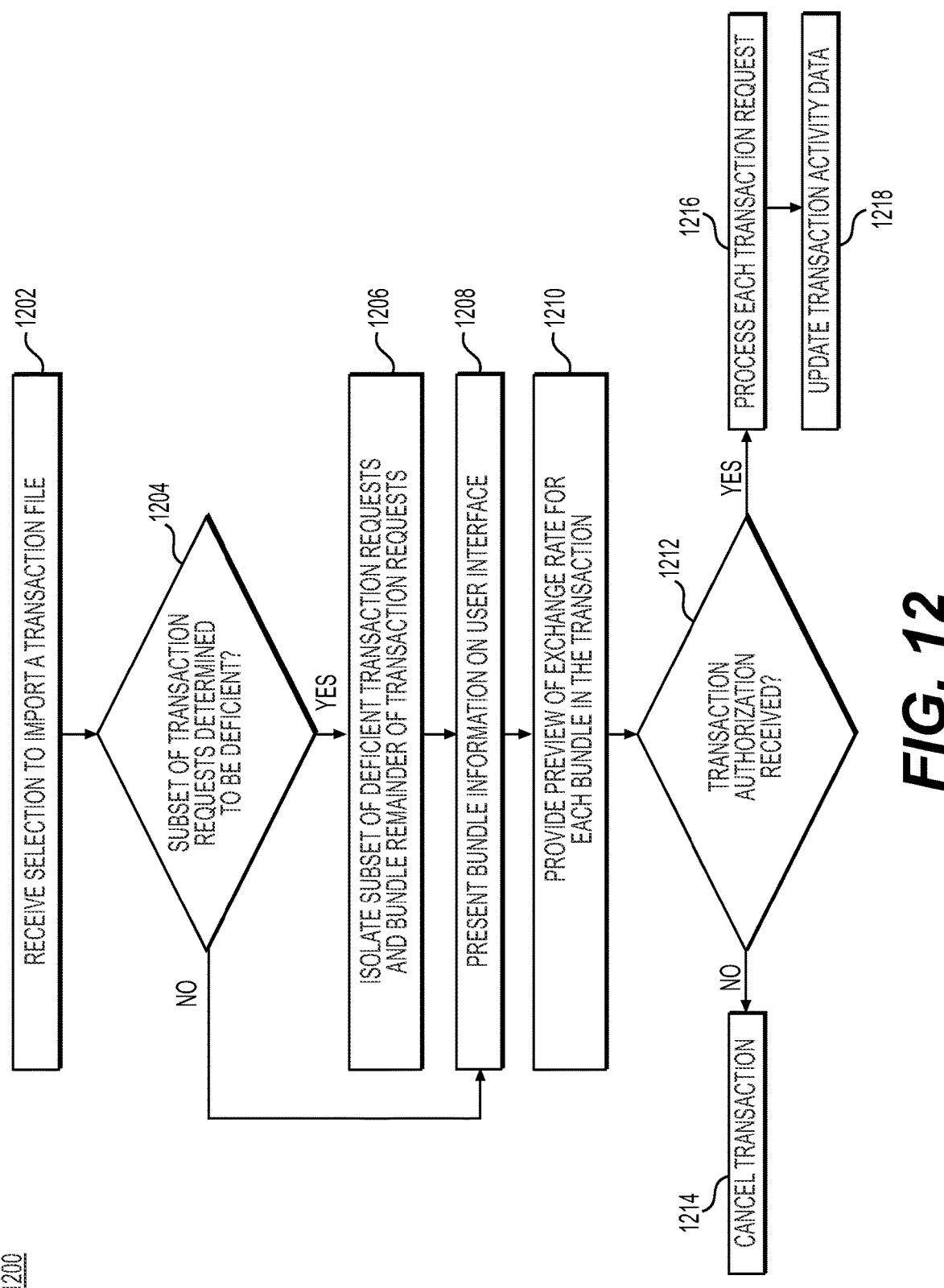
FIG. 12 illustrates a flowchart of an exemplary method of executing an electronic batch transaction on an electronic transaction system, according to one aspect of the present disclosure.

FIG. 12 illustrates a flowchart of an exemplary method 1200 of executing an electronic batch transaction of the present disclosure. Additional reference will be made to FIGS. 8-11 to supplement discussion of the method 1100. Exemplary process flows of the method 1200, performed in accordance with the real-time transaction system 100, including sub-systems 200, 300, 400, 500, and 600 above, are described hereinafter.

At step 1202, an embodiment may receive a selection to import a previously uploaded transaction file. The transaction file may be imported onto the application portal via interaction with a user interface. For instance, a user may import the transaction file by, for example, selecting the relevant file from a drop-down list (not illustrated), dragging and dropping the relevant file into a designated area of the application interface, selecting the file from its stored destination via navigation through a database (not illustrated), and other techniques not explicitly disclosed here. In an embodiment, the transaction file may contain a batch of transaction requests. Each transaction request may contain information associated with a transaction from a sender account to a receiver account. The information may include: identifying details associated with the sender and/or receiver accounts, a designated payment amount, a payment currency, a receiver currency, and the like.

At step 1204, an embodiment may determine whether one or more of the transaction requests in the transaction file are deficient. More particularly, an embodiment may analyze the characteristic information associated with each transaction request to determine if the transaction is capable of being processed. Responsive to determining, at step 1204, that no deficiencies exist with any of the transaction requests, an embodiment may proceed to step 1208. Conversely, responsive to determining, at 1204, that at least one transaction request contained a deficiency, an embodiment may, at step 1206, isolate each deficient transaction request from the remainder of valid requests.

At step 1208, an embodiment may group the remainder of valid transaction requests into bundles and present the bundle information to the user. In an embodiment, each bundle may be based upon a receiving currency of a transaction and each bundle contains those transaction requests having the same receiving currency (e.g., all transaction requests with EUR as a receiving currency may be bundled together, all transaction requests with GBP as a receiving currency may be bundled together, etc.). In an embodiment, each bundle may contain information pertinent to the bundle that an embodiment may present to the user. For example, with reference to section 920 of FIG. 9, each bundle may provide an indication of: the number of payments within the bundle, the payment currency, and the total cost of the bundle transaction (i.e., the amount sent to the receiver account along with the fees associated therewith). In an embodiment, a user may choose to proceed forward with the transaction without processing any of the payments associated with the deficient transaction requests. Stated differently, the presence of one or more deficient transaction requests in the transaction file does not jeopardize the ability of the remainder of transaction requests from being processed. Alternatively, in another embodiment, a user may choose to address the deficiencies associated with the deficient transaction requests prior to proceeding forward with the transaction.

At step 1210, an embodiment may provide a preview for all valid transactions. More particularly, responsive to detecting a preview selection from a user, an embodiment may provide, as illustrated in FIG. 11, a preview page that apprises the user of the total transaction amount (i.e., total amount sent to receiver accounts along with the fees associated with the transmission) as well as the exchange rate utilized for each bundle, as shown in section 1110. Additionally, the preview page may contain an indication (e.g. manifest as a notification box 1120) of a time period in which authorization for the transaction needs to be received for it to be properly processed. Responsive to determining, at step 1212, that authorization for the transaction has not been received within the predetermined time period, an embodiment may, at 1214, cancel the transaction. At this stage, a user may need to refresh the preview page or re-import the transaction file. Conversely, responsive to determining, at step 1212, that authorization for the transaction has been received within the predetermined time period, an embodiment may, at 1216, process each valid transaction request. At step 1218, an embodiment may update a transaction activity data store with the results of the facilitated transaction process. These results may be visible to a user, for example, by navigation to a transaction activity tab of the application portal.

Figure 13:
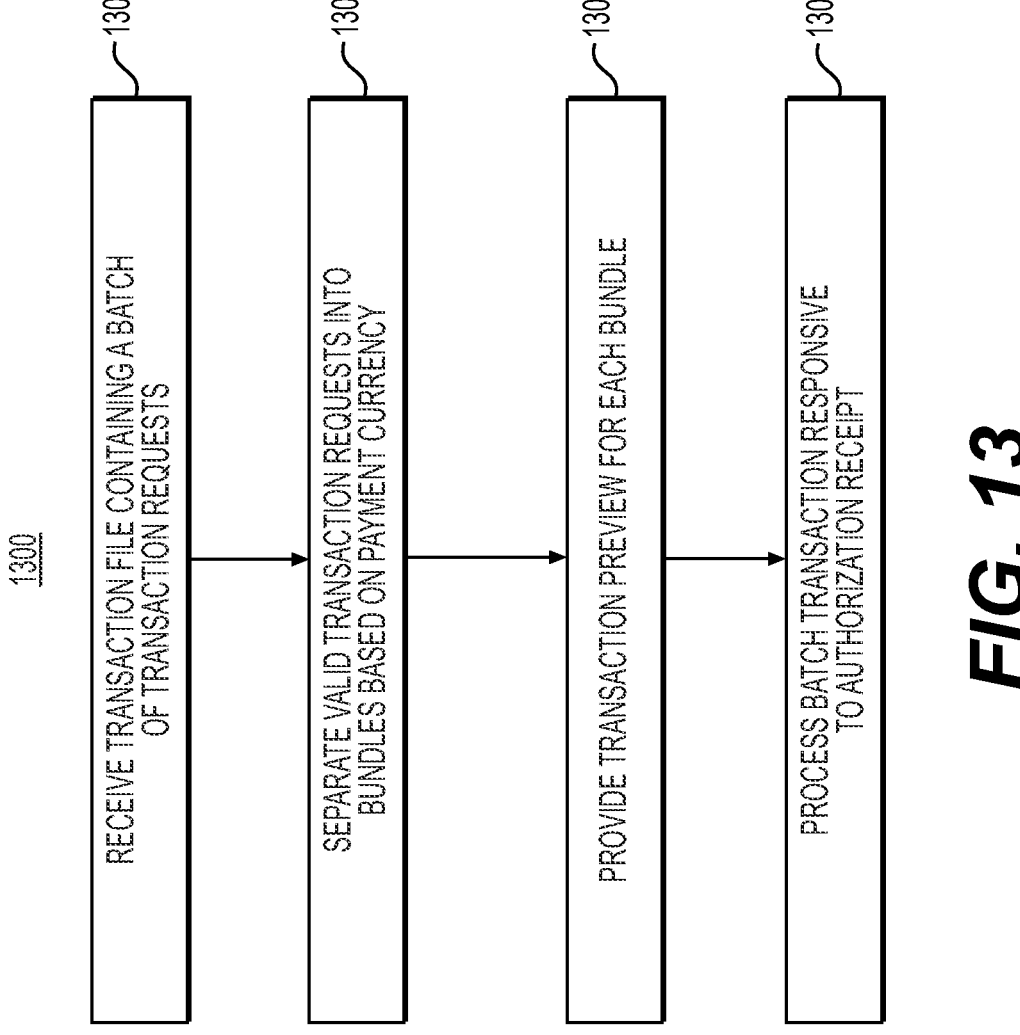
FIG. 13 illustrates a flowchart of an exemplary method of executing an electronic batch transaction on an electronic transaction system, according to one aspect of the present disclosure.

FIG. 13 illustrates a flowchart of an exemplary method 1300 of executing an electronic batch transaction of the present disclosure. Exemplary process flows of the method 1300, performed in accordance with the real-time transaction system 100, including sub-systems 200, 300, 400, 500, and 600 above, are described hereinafter.

At step 1302, an embodiment may receive, at an application portal, a selection to import a previously uploaded transaction file. The transaction file may contain a batch of transaction requests (i.e., payments to be submitted from a sender account to a user account in a designated payment currency). During import, an embodiment may analyze each of the transaction requests to determine if they are valid. At step 1304, an embodiment may isolate the deficient transaction requests from the remainder of valid requests. Thereafter, an embodiment may group the valid requests into bundles based, for instance, on the receiver currency (i.e., the currency that will ultimately be deposited in the receiver's account). At step 1306, an embodiment may provide the user with a preview of the transaction. The preview may apprise the user of the total transaction amount (i.e., total amount sent to receiver accounts along with the fees associated with the transmission) as well as the exchange rate utilized for each bundle. Additionally, the preview may contain an indication of a time period in which authorization for the transaction needs to be received for it to be processed. At step 1308, responsive to receiving authorization input from the user to process the transaction within the predetermined time period, an embodiment may facilitate funds transfer from the sender account to the plurality of designated receiver accounts in the batch.

In addition to a standard desktop, or server, it is fully within the scope of this disclosure that any computer system capable of the required storage and processing demands would be suitable for practicing the embodiments of the present disclosure. This may include tablet devices, smart phones, pin pad devices, and any other computer devices, whether mobile or even distributed on a network (i.e., cloud based).

Unless specifically stated otherwise, as apparent from the following discussions, it is appreciated that throughout the specification discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

Figure 14:
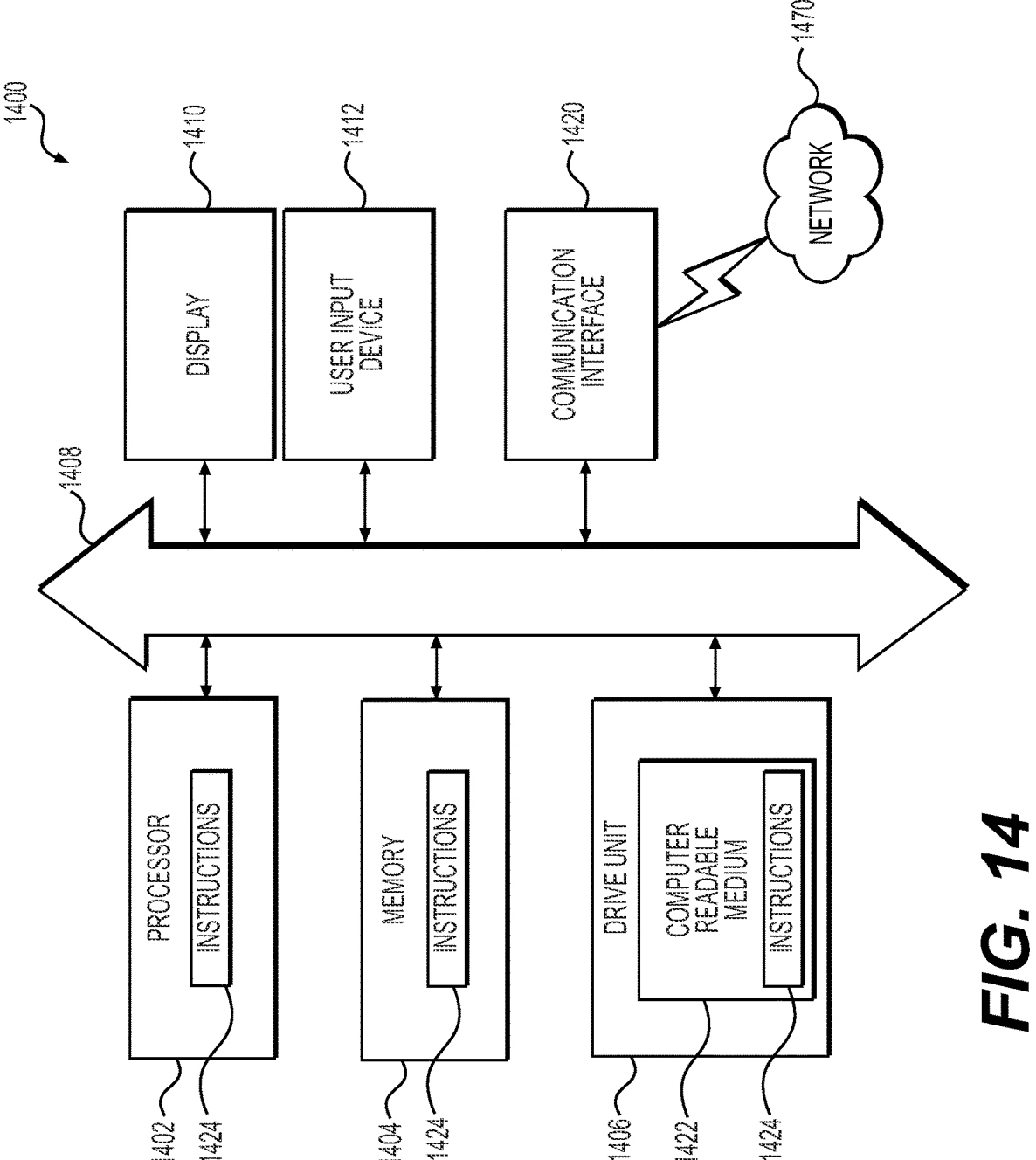
FIG. 14 illustrates a computer system for executing the techniques described herein.

FIG. 14 illustrates a computer system designated 1400. The computer system 1400 can include a set of instructions that can be executed to cause the computer system 1400 to perform any one or more of the methods or computer based functions disclosed herein. The computer system 1400 may operate as a standalone device or may be connected, e.g., using a network, to other computer systems or peripheral devices.

In a networked deployment, the computer system 1400 may operate in the capacity of a server or as a client user computer in a server-client user network environment, or as a peer computer system in a peer-to-peer (or distributed) network environment. The computer system 1400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 1300 can be implemented using electronic devices that provide voice, video, or data communication. Further, while a single computer system 1300 is illustrated, the term "system" shall also be taken to include any collection of systems or sub-systems that individually or jointly execute a set, or multiple sets, of instructions to perform one or more computer functions.

As illustrated in FIG. 14, the computer system 1400 may include a processor 1402, e.g., a central processing unit (CPU), a graphics processing unit (GPU), or both. The processor 1402 may be a component in a variety of systems. For example, the processor 1402 may be part of a standard personal computer or a workstation. The processor 1402 may be one or more general processors, digital signal processors, application specific integrated circuits, field programmable gate arrays, servers, networks, digital circuits, analog circuits, combinations thereof, or other now known or later developed devices for analyzing and processing data. The processor 1302 may implement a software program, such as code generated manually (i.e., programmed).

The computer system 1400 may include a memory 1404 that can communicate via a bus 1408. The memory 1404 may be a main memory, a static memory, or a dynamic memory. The memory 1404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 1404 includes a cache or random-access memory for the processor 1402. In alternative implementations, the memory 1404 is separate from the processor 1402, such as a cache memory of a processor, the system memory, or other memory. The memory 1404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1404 is operable to store instructions executable by the processor 1402. The functions, acts or tasks illustrated in the figures or described herein may be performed by the programmed processor 1402 executing the instructions stored in the memory 1404. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel payment and the like.

As shown, the computer system 1400 may further include a display unit 1410, such as a liquid crystal display (LCD), an organic light emitting diode (OLED), a flat panel display, a solid-state display, a cathode ray tube (CRT), a projector, a printer or other now known or later developed display device for outputting determined information. The display 1410 may act as an interface for the user to see the functioning of the processor 1402, or specifically as an interface with the software stored in the memory 1404 or in the drive unit 1406.

Additionally or alternatively, the computer system 1400 may include an input device 1412 configured to allow a user to interact with any of the components of system 1300. The input device 1412 may be a number pad, a keyboard, or a cursor control device, such as a mouse, or a joystick, touch screen display, remote control, or any other device operative to interact with the computer system 1400.

The computer system 1400 may also or alternatively include a disk or optical drive unit 1406. The disk drive unit 1406 may include a computer-readable medium 1422 in which one or more sets of instructions 1424, e.g., software, can be embedded. Further, the instructions 1424 may embody one or more of the methods or logic as described herein. The instructions 1424 may reside completely or partially within the memory 1404 and/or within the processor 1402 during execution by the computer system 1400. The memory 1404 and the processor 1402 also may include computer-readable media as discussed above.

In some systems, a computer-readable medium 1422 includes instructions 1424 or receives and executes instructions 1424 responsive to a propagated signal so that a device connected to a network 1470 can communicate voice, video, audio, images, or any other data over the network 1470. Further, the instructions 1424 may be transmitted or received over the network 1470 via a communication port or interface 1420, and/or using a bus 1408. The communication port or interface 1420 may be a part of the processor 1402 or may be a separate component. The communication port 1420 may be created in software or may be a physical connection in hardware. The communication port 1420 may be configured to connect with a network 1470, external media, the display 1410, or any other components in system 1400, or combinations thereof. The connection with the network 1470 may be a physical connection, such as a wired Ethernet connection or may be established wirelessly as discussed below. Likewise, the additional connections with other components of the system 1400 may be physical connections or may be established wirelessly. The network 1470 may alternatively be directly connected to the bus 1408.

While the computer-readable medium 1422 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 1422 may be non-transitory, and may be tangible. Specifically, in the context of this document, the computer readable medium is not a signal and "non-transitory" may include all media except signal media.

The computer-readable medium 1422 can include a solid-state memory such as a memory card or other package that houses one or more non-volatile read-only memories. The computer-readable medium 1422 can be a random-access memory or other volatile re-writable memory. Additionally or alternatively, the computer-readable medium 1422 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 1400 may be connected to one or more networks 1470. The network 1470 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 1470 may include wide area networks (WAN), such as the Internet, local area networks (LAN), campus area networks, metropolitan area networks, a direct connection such as through a Universal Serial Bus (USB) port, or any other networks that may allow for data communication. The network 1470 may be configured to couple one computing device to another computing device to enable communication of data between the devices. The network 1470 may generally be enabled to employ any form of machine-readable media for communicating information from one device to another. The network 1470 may include communication methods by which information may travel between computing devices. The network 1470 may be divided into sub-networks. The sub-networks may allow access to all of the other components connected thereto or the sub-networks may restrict access between the components. The network 1470 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel payment. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP, etc.) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosed embodiments are not limited to any particular implementation or programming technique and that the disclosed embodiments may be implemented using any appropriate techniques for implementing the functionality described herein. The disclosed embodiments are not limited to any particular programming language or operating system.

It should be appreciated that in the above description of exemplary embodiments, various features of the embodiments are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that a claimed embodiment requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the function.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the present disclosure, those skilled in the art will recognize that other and further modifications may be made thereto without departing from the spirit of the present disclosure, and it is intended to claim all such changes and modifications as falling within the scope of the present disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method of executing a batch of electronic transactions by a real-time transaction system, the method comprising:

providing, by the real-time transaction system, a user interface to an information handling user device associated with the real-time transaction system;

capturing, by the user interface, a user interaction comprising a selection to import a transaction file;

receiving, by the real-time transaction system, the transaction file comprising a plurality of transaction requests;

extracting, by the real-time transaction system, one or more transaction features from each of the plurality of transaction requests;

determining, by the real-time transaction system, that at least one subset of the plurality of transaction requests is deficient based on the one or more transaction features;

generating, by the real-time transaction system and in a batch record table, a placeholder transaction request for each of the plurality of transaction requests, wherein the placeholder transaction request is only generated for each of the plurality of transaction requests not included in the at least one subset;

generating, by the real-time transaction system, a display of an indication of a result;

transmitting, by the real-time transaction system, the display to the information handling user device for display on the user interface;

dynamically separating, by the real-time transaction system, the plurality of transaction requests not included in the at least one subset into one or more groups of transaction requests based on a currency type associated with a receiving account for each of the plurality of transaction requests; and executing, by the real-time transaction system, a transaction process for each of the plurality of transaction requests not included in the at least one subset according to the one or more groups.

2. The computer-implemented method of claim 1, wherein the plurality of transaction requests correspond to cross-border transactions.

3. The computer-implemented method of claim 1, wherein each of the plurality of transaction requests designate an identical sender account for utilization in the transaction process.

4. The computer-implemented method of claim 1, wherein the one or more transaction features comprise at least one of receiver information, sender information, transaction value, and currency type.

5. The computer-implemented method of claim 1, further comprising:

generating, by the real-time transaction system, a visually distinguished area of the user interface including the at least one subset of the plurality of transaction requests determined to be deficient.

6. The computer-implemented method of claim 5, further comprising presenting, responsive to receiving a user interaction input with a portion of the visually distinguished area, an error description display for the at least one subset of the plurality of transaction requests.

7. The computer-implemented method of claim 1, further comprising:

determining, by the real-time transaction system, a real-time exchange rate for each of the one or more groups;

presenting, on the user interface, an indication of results associated with the determining for a predetermined period of time; and executing, by the real-time transaction system, the transaction process within the predetermined period of time.

8. The computer-implemented method of claim 7, further comprising cancelling, responsive to not receiving a user authorization input within the predetermined period of time, the transaction process.

9. The computer-implemented method of claim 1, further comprising updating, on the real-time transaction system, a transaction activity data store with results of the transaction process.

10. A real-time transaction system, comprising:

one or more computer readable media storing instructions for executing a batch of electronic transactions; and one or more processors configured to execute the instructions to perform operations comprising:

providing, by the real-time transaction system, a user interface to an information handling user device associated with the real-time transaction system;

capturing, by the user interface, a user interaction comprising a selection to import a transaction file;

receiving, by the real-time transaction system, the transaction file comprising a plurality of transaction requests;

extracting, by the real-time transaction system, one or more transaction features from each of the plurality of transaction requests;

determining, by the real-time transaction system, that at least one subset of the plurality of transaction requests is deficient based on the one or more transaction features;

generating, by the real-time transaction system and in a batch record table, a placeholder transaction request for each of the plurality of transaction requests, wherein the placeholder transaction request is only generated for each of the plurality of transaction requests not included in the at least one subset;

generating, by the real-time transaction system, a display of an indication of a result;

transmitting, by the real-time transaction system, the display to the information handling user device for display on the user interface;

dynamically separating, by the real-time transaction system, the plurality of transaction requests not included in the at least one subset into one or more groups of transaction requests based on a currency type associated with a receiving account for each of the plurality of transaction requests; and executing, by the real-time transaction system, a transaction process for each of the plurality of transaction requests not included in the at least one subset according to the one or more groups.

11. The real-time transaction system of claim 10, wherein each of the plurality of transaction requests designate an identical sender account for utilization in the transaction process.

12. The real-time transaction system of claim 10, wherein the one or more transaction features comprise at least one of receiver information, sender information, transaction value, and currency type.

13. The real-time transaction system of claim 10, wherein the operations further comprise:

generating, by the real-time transaction system, a visually distinguished area of the user interface including the at least one subset of the plurality of transaction requests determined to be deficient.

14. The real-time transaction system of claim 13, wherein the operations further comprise:

presenting, responsive to receiving a user interaction input with a portion of the visually distinguished area, an error description display for the at least one subset of the plurality of transaction requests.

15. The real-time transaction system of claim 10, wherein the operations to facilitate further comprise:

determining, by the real-time transaction system, a real-time exchange rate for each of the one or more groups;

presenting, on the user interface, an indication of results associated with the determining for a predetermined period of time; and executing, by the real-time transaction system, the transaction process within the predetermined period of time.

16. The real-time transaction system of claim 15, wherein the operations further comprise:

cancelling, responsive to not receiving a user authorization input within the predetermined period of time, the transaction process.

17. The real-time transaction system of claim 10, wherein the operations further comprise:

updating, on the real-time transaction system, a transaction activity data store with results of the transaction process.

18. A non-transitory computer-readable medium storing instructions for executing a batch of electronic transactions, the instructions, when executed by one or more processors, causing the one or more processors to perform operations, comprising:

providing, by a real-time transaction system, a user interface to an information handling user device associated with the real-time transaction system;

capturing, by the user interface, a user interaction comprising a selection to import a transaction file;

receiving, by the real-time transaction system, the transaction file comprising a plurality of transaction requests;

extracting, by the real-time transaction system, one or more transaction features from each of the plurality of transaction requests;

determining, by the real-time transaction system, that at least one subset of the plurality of transaction requests is deficient based on the one or more transaction features;

generating, by the real-time transaction system and in a batch record table, a placeholder transaction request for each of the plurality of transaction requests, wherein the placeholder transaction request is only generated for each of the plurality of transaction requests not included in the at least one subset;

generating, by the real-time transaction system, a display of an indication of a result;

transmitting, by the real-time transaction system, the display to the information handling user device for display on the user interface;

dynamically separating, by the real-time transaction system, the plurality of transaction requests not included in the at least one subset into one or more groups of transaction requests based on a currency type associated with a receiving account for each of the plurality of transaction requests; and executing, by the real-time transaction system, a transaction process for each of the plurality of transaction requests not included in the at least one subset according to the one or more groups.

* * * * *